(12) United States Patent
Teoh

(10) Patent No.: US 9,890,964 B2
(45) Date of Patent: *Feb. 13, 2018

(54) COAXIAL VENTILATOR

(71) Applicant: Siang Teik Teoh, Selangor (MY)

(72) Inventor: Siang Teik Teoh, Selangor (MY)

(73) Assignee: Siang Teik Teoh, Kuala Lumpar (MY)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,975

(22) Filed: May 31, 2016

(65) Prior Publication Data

US 2016/0348928 A1     Dec. 1, 2016

Related U.S. Application Data

(63) Continuation-in-part of application No. 14/798,462, filed on Jul. 14, 2015, now Pat. No. 9,739,493, which (Continued)

(51) Int. Cl.
| | |
|---|---|
| *F24F 7/02* | (2006.01) |
| *F24F 5/00* | (2006.01) |
| *F24F 7/04* | (2006.01) |
| *F24F 7/08* | (2006.01) |
| *F24F 12/00* | (2006.01) |
| *F24F 13/02* | (2006.01) |
| *F24F 13/26* | (2006.01) |

(52) U.S. Cl.
CPC .......... *F24F 5/0035* (2013.01); *F24F 5/0042* (2013.01); *F24F 7/02* (2013.01); *F24F 7/04* (2013.01); *F24F 7/08* (2013.01); *F24F 12/00* (2013.01); *F24F 13/0281* (2013.01); *F24F 13/26* (2013.01); *Y02B 10/40* (2013.01)

(58) Field of Classification Search
CPC .......... F24F 5/0035; F24F 5/0042; F24F 7/02; F24F 7/04; F24F 7/08; F24F 12/00
See application file for complete search history.

(56) References Cited

U.S. PATENT DOCUMENTS

| 61,820 | A | * | 2/1867 | Estes | .......................... | F24F 7/02 |
| | | | | | | 454/250 |
| 424,778 | A | * | 4/1890 | Gee | .......................... | F24F 7/00 |
| | | | | | | 126/85 B |

(Continued)

OTHER PUBLICATIONS

U.S. Appl. No. 14/798,462, filed Jul. 14, 2015, 2016/0102876.

(Continued)

*Primary Examiner* — Steven B McAllister
*Assistant Examiner* — Jonathan Cotov
(74) *Attorney, Agent, or Firm* — McCarter & English, LLP

(57) ABSTRACT

A coaxial ventilator exchanges atmosphere between parts of a building that are at differing heights. The coaxial ventilator includes an outer conduit that extends from an upper end thereof downward to a lower end thereof. The outer conduit surrounds an inner conduit that extends substantially the entire length of the outer conduit. Both the outer and inner conduits are open at their respective upper ends and lower ends. Temperatures of atmosphere both surrounding and within the outer conduit and the inner conduit induce an exchange of atmosphere between the coaxial ventilator and surrounding atmosphere.

20 Claims, 17 Drawing Sheets

Related U.S. Application Data is a continuation-in-part of application No. 14/391,387, filed as application No. PCT/US2014/033101 on Apr. 4, 2014, now Pat. No. 9,739,495.

(60) Provisional application No. 61/809,292, filed on Apr. 5, 2013, provisional application No. 61/991,436, filed on May 9, 2014.

(56) References Cited

U.S. PATENT DOCUMENTS

| | | | |
|---|---|---|---|
| 992,581 A | | 5/1911 | Noonan et al. |
| 1,254,643 A | * | 1/1918 | Akerlund ............... F24D 5/04 |
| | | | 237/48 |
| 1,689,246 A | * | 10/1928 | Knapen ............... F24F 7/00 |
| | | | 454/1 |
| 1,690,905 A | * | 11/1928 | McDevitt ............... F24F 7/00 |
| | | | 454/250 |
| 2,203,590 A | | 6/1940 | Bock |
| 2,277,982 A | * | 3/1942 | Hosbein ............... F24F 7/02 |
| | | | 454/368 |
| 2,856,837 A | * | 10/1958 | Thulman ............... F23J 11/00 |
| | | | 126/307 R |
| 2,916,983 A | * | 12/1959 | Kinkead ............... F23J 13/025 |
| | | | 126/307 R |
| 3,315,586 A | * | 4/1967 | Marrapese ............... F23L 17/04 |
| | | | 126/307 R |
| 3,361,051 A | * | 1/1968 | Fair ............... F23L 17/04 |
| | | | 126/307 A |
| 3,815,478 A | | 6/1974 | Teodorescu et al. |
| 3,815,487 A | | 6/1974 | Teodorescu et al. |
| 4,530,273 A | * | 7/1985 | Smith ............... E04D 13/17 |
| | | | 454/339 |
| 5,000,081 A | * | 3/1991 | Gilmer ............... F24F 7/08 |
| | | | 165/54 |
| 5,722,483 A | * | 3/1998 | Gibson ............... F24F 3/044 |
| | | | 165/54 |
| 5,934,993 A | * | 8/1999 | Maruyama ............... F24F 7/06 |
| | | | 454/237 |
| 6,014,968 A | | 1/2000 | Teoh |
| 6,289,886 B1 | * | 9/2001 | Radke ............... F24C 15/002 |
| | | | 126/307 A |
| 7,818,928 B2 | * | 10/2010 | Brunt ............... F23J 13/04 |
| | | | 52/169.5 |
| 9,003,717 B2 | * | 4/2015 | Barre ............... F24F 7/02 |
| | | | 52/198 |
| 9,086,222 B2 | * | 7/2015 | Tai ............... F24F 7/04 |
| 2010/0090469 A1 | | 4/2010 | Sullivan |
| 2012/0280503 A1 | * | 11/2012 | Mahawili ............... F03D 9/00 |
| | | | 290/52 |
| 2014/0109610 A1 | * | 4/2014 | Wulf ............... F24F 1/00 |
| | | | 62/314 |
| 2014/0174116 A1 | * | 6/2014 | Habeebullah ............... F28C 3/08 |
| | | | 62/186 |

OTHER PUBLICATIONS

U.S. Appl. No. 14/391,387, filed Oct. 8, 2014, 2015/0292761.
U.S. Appl. No. 61/991,436, filed May 9, 2014.
PCT/US2014/033101, Apr. 4, 2014, WO 2014/165835.
U.S. Appl. No. 61/809,292, filed Apr. 5, 2013.
PCT International Search Report and Written Opinion for PCT/US2014/033101 dated Aug. 22, 2014, 8 pages.

* cited by examiner

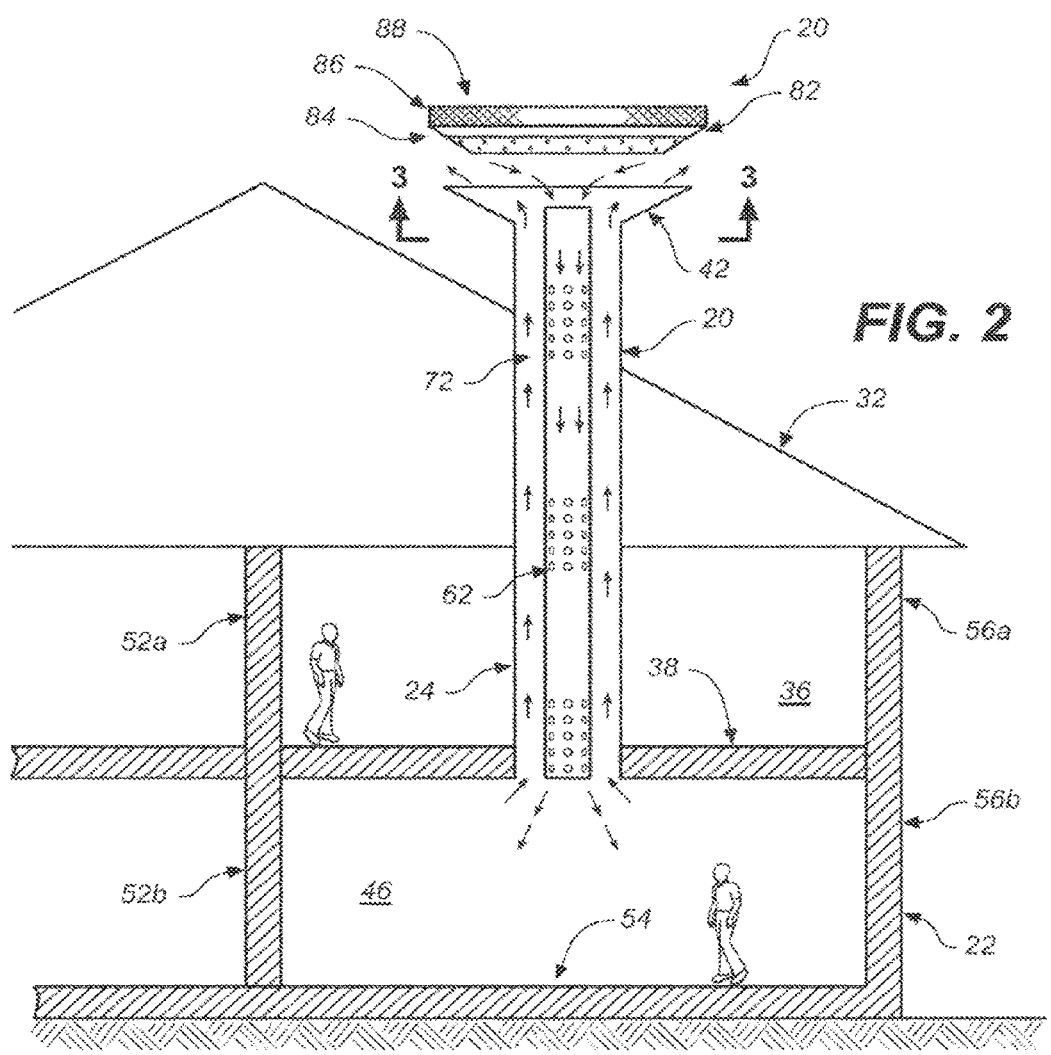

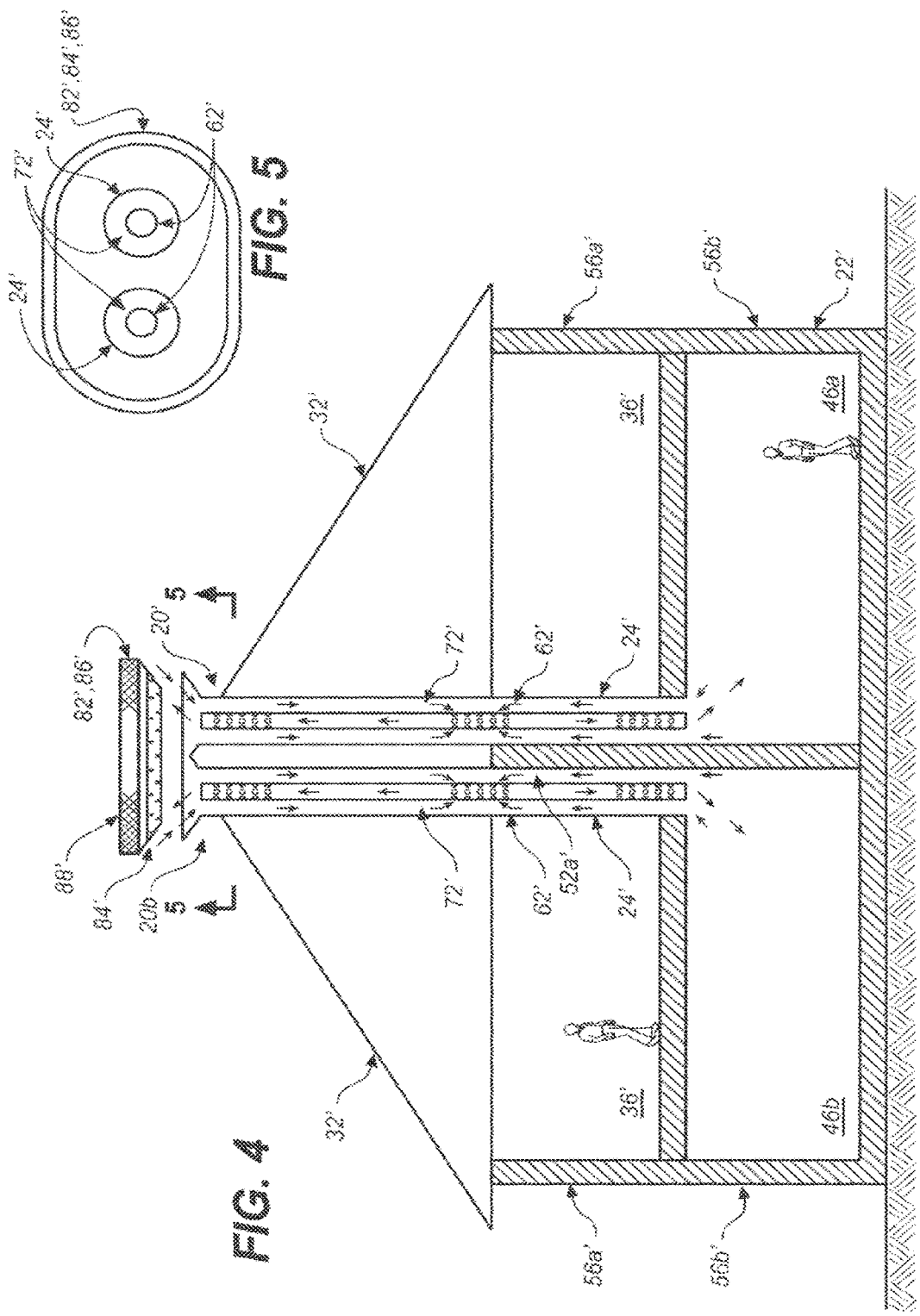

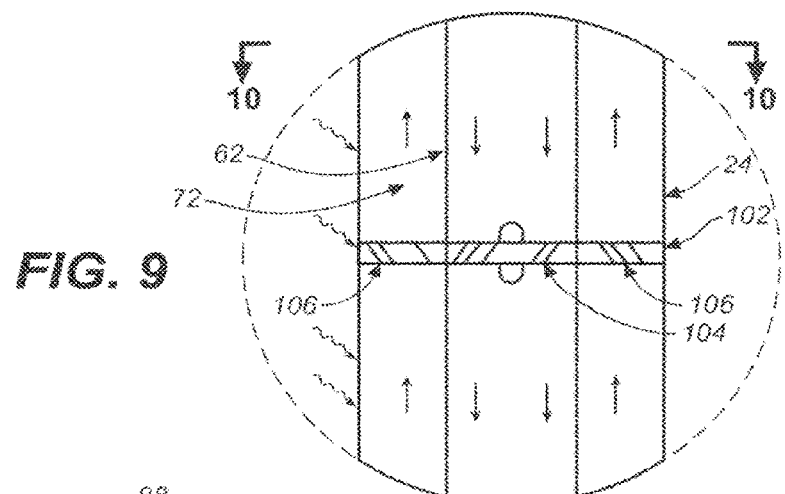
FIG. 9
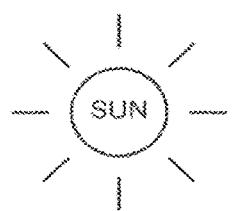
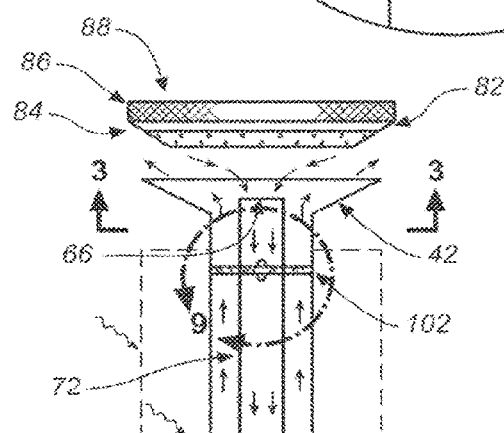
FIG. 8
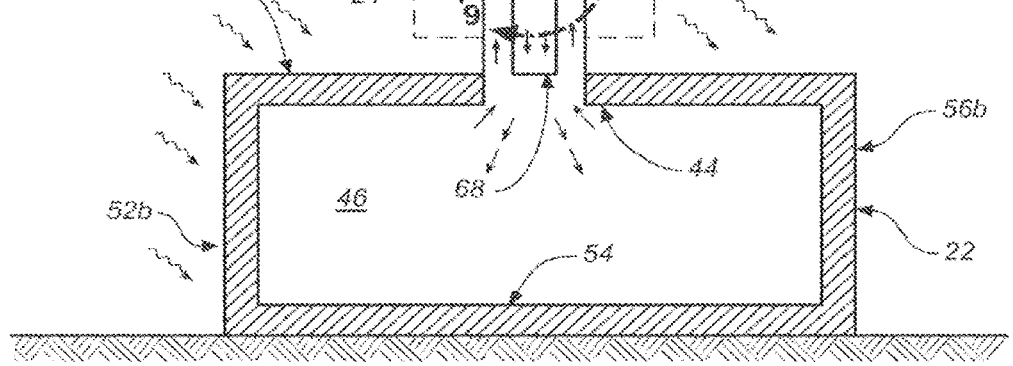

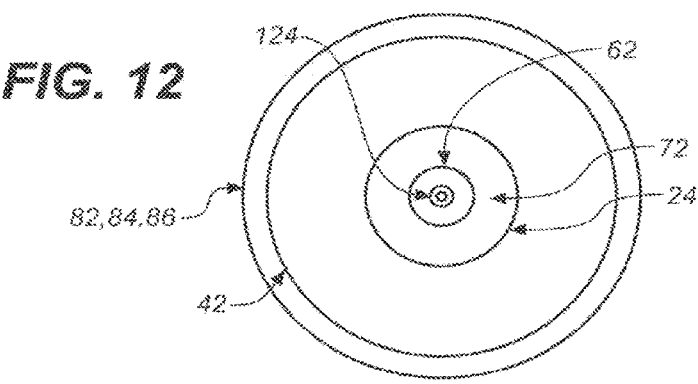
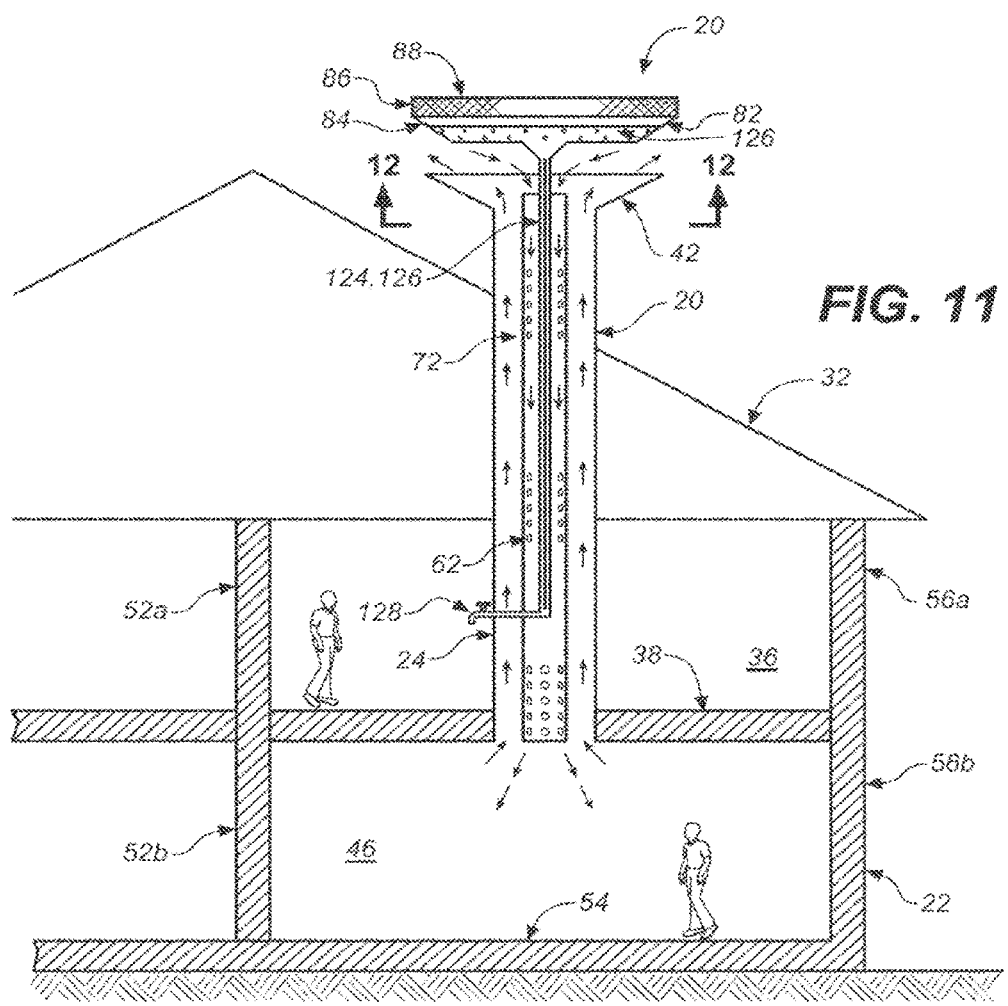

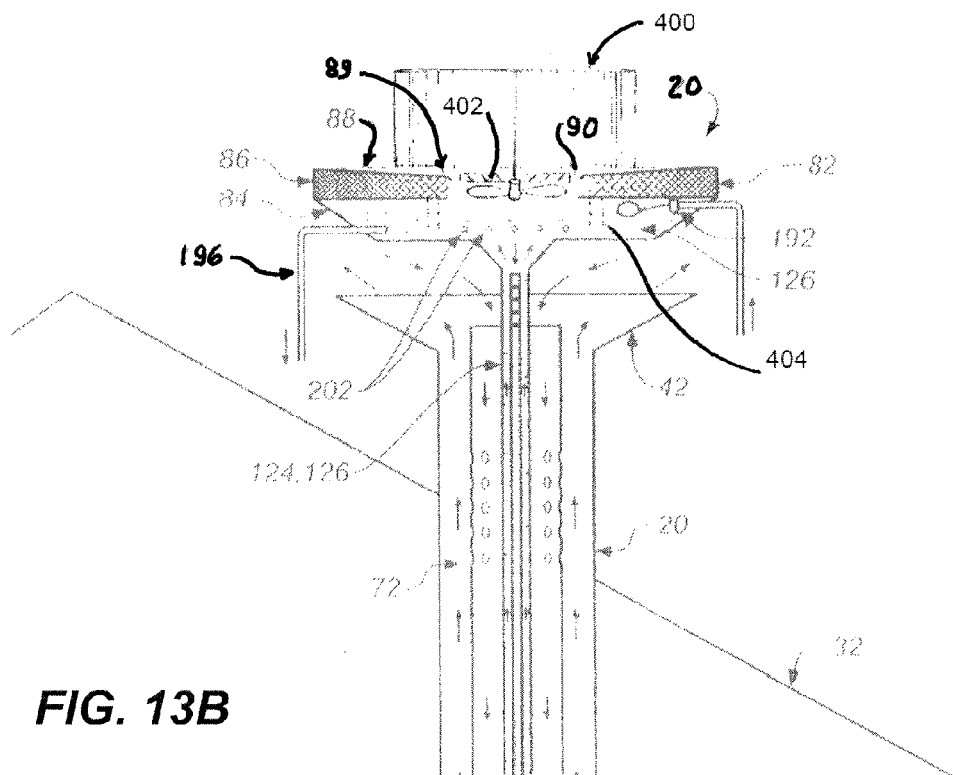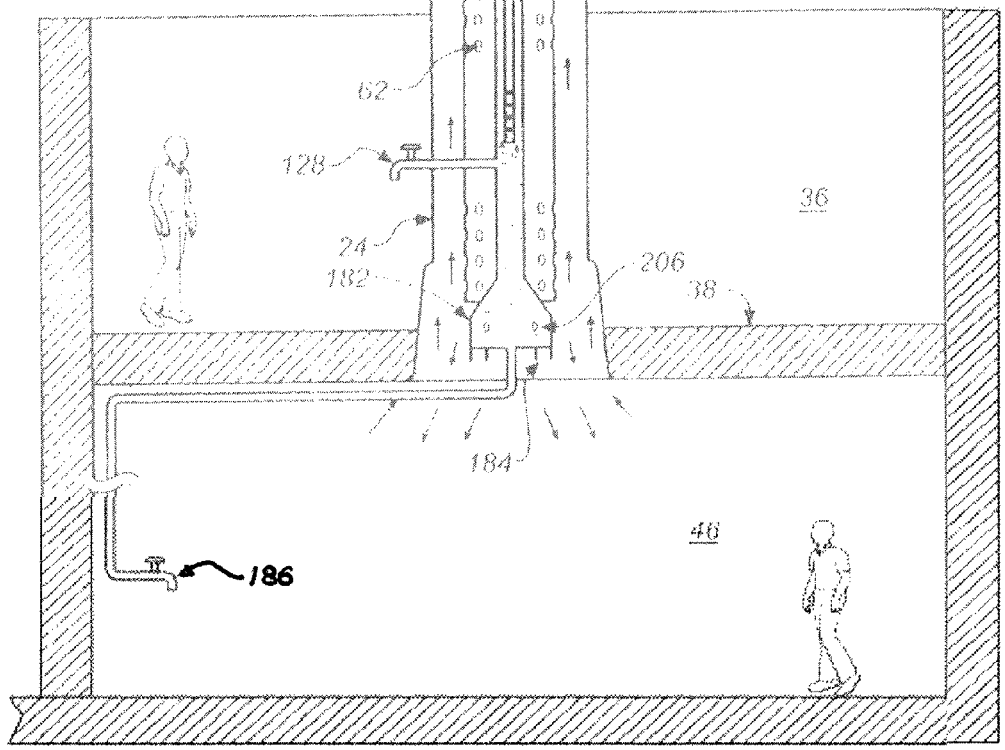
FIG. 13B

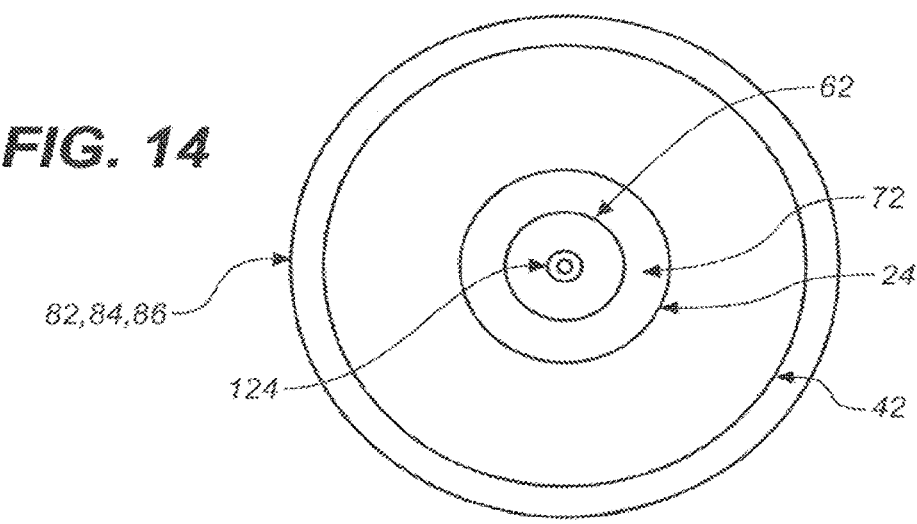
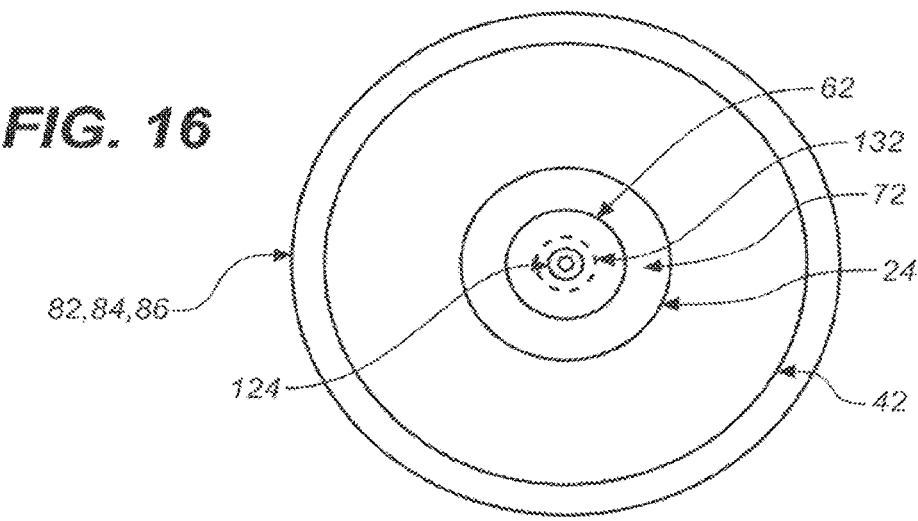
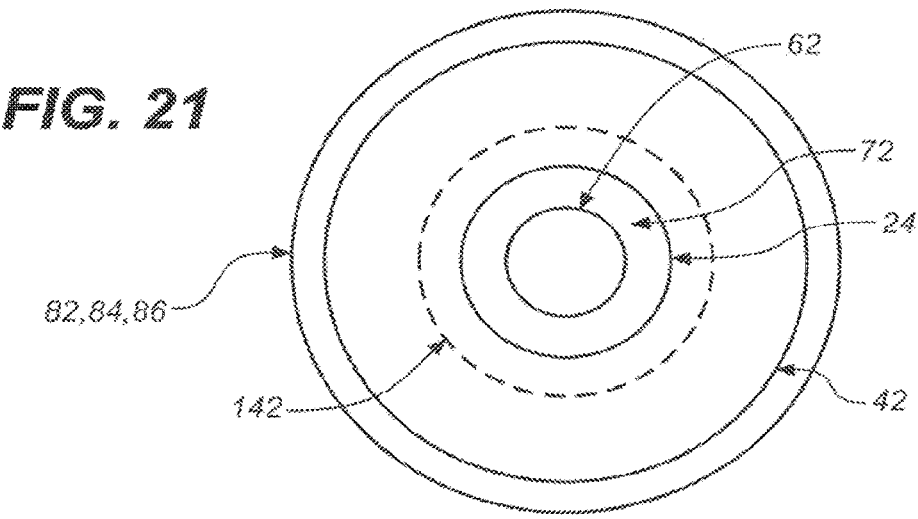

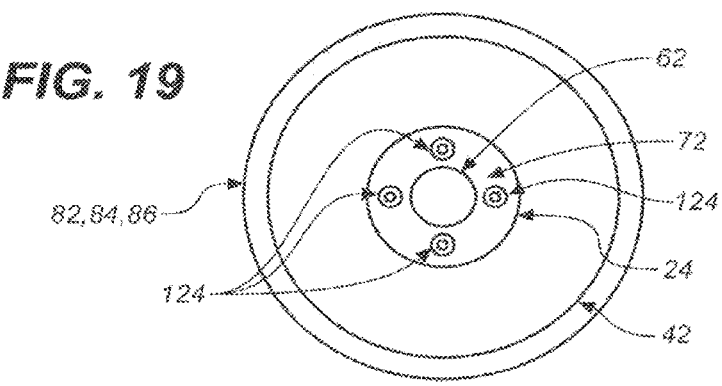
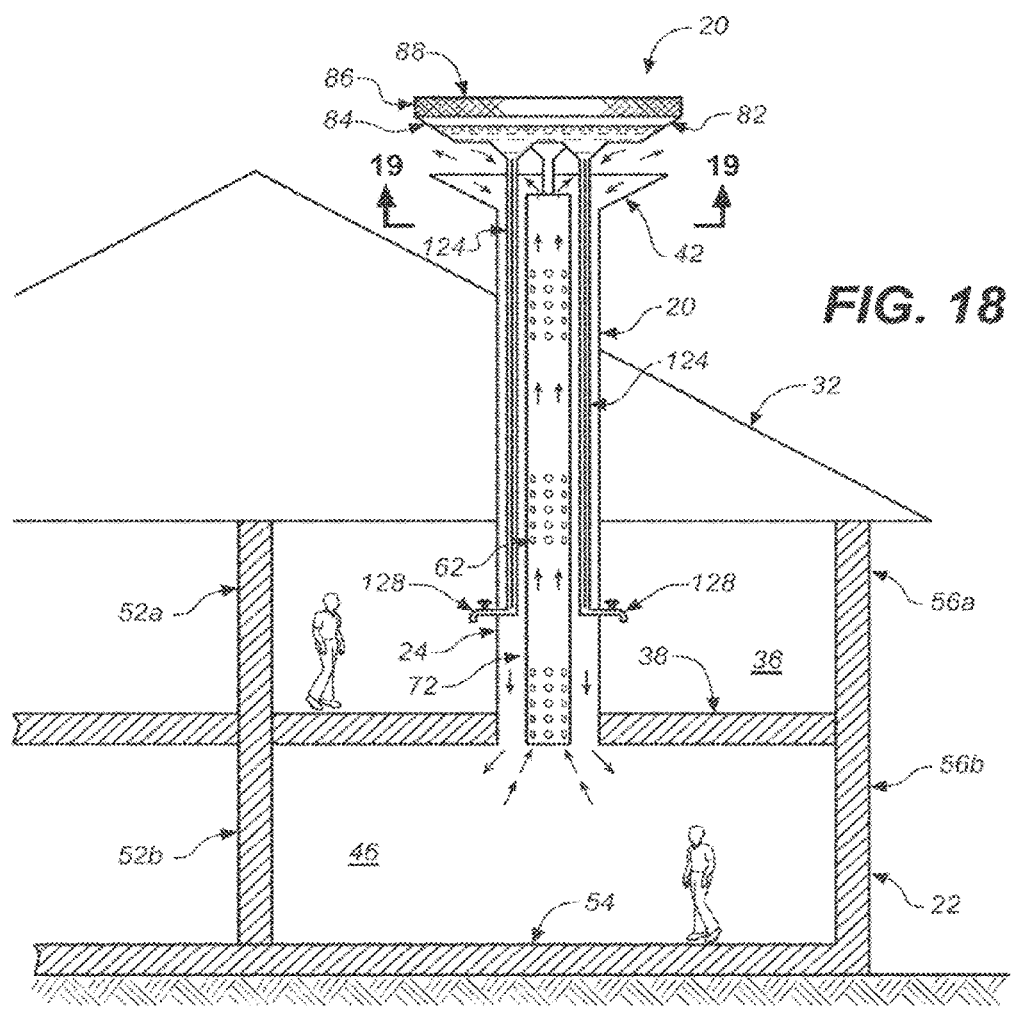

COAXIAL VENTILATOR

CROSS REFERENCE(S) TO RELATED APPLICATION(S)

This application claims priority benefit to each of the applications listed in this cross-reference section. This application is a continuation-in-part patent application of U.S. patent application Ser. No. 14/798,462, entitled "Coaxial Ventilator," filed on Jul. 14, 2015, which is a continuation-in-part patent application of U.S. patent application Ser. No. 14/391,387, entitled "Coaxial Ventilator," filed on Oct. 8, 2014, which claims priority under 35 U.S.C. § 371 from Patent Cooperation Treaty ("PCT") International Patent Application PCT/US2014/033101, entitled "Coaxial Ventilator," filed with the US Patent and Trademark Office ("USPTO") on Apr. 4, 2014, claiming the benefit of U.S. Provisional Patent Application Ser. No. 61/809,292, entitled "Coaxial Ventilator," that was filed with the USPTO on Apr. 5, 2013; and also the benefit of U.S. Provisional Patent Application Ser. No. 61/991,436, entitled "Coaxial Ventilator," that was filed with the USPTO on May 9, 2014. The entire disclosure of these prior applications are expressly incorporated herein by reference.

BACKGROUND OF THE INVENTION

Technical Field

The present disclosure relates generally to building ventilation and, more particularly, to a ventilation system that exploits a temperature difference between a building's interior and the surrounding atmosphere.

Background Art

Using gravity for moving heating, circulating and ventilating air is a simple technique that has been a well understood and practiced for more than 100 years. Hot air is less dense than cold air and will therefore tend to rise while cooler air tends to settle. However, the force produced in this way is very slight, and is easily overcome by friction in ducts and by wind pressure around a building. A gravity ventilation system is simpler than a forced air system, requires no skilled attention, and is less expensive to install. Widespread use of gravity heating air and water systems ended mainly because such systems:
1. were difficult to install requiring large ducts and many penetrations through floor slabs etc.; and
2. their installation required experienced engineers who could assess a building's suitability for a gravity heating systems.

Historically, the advantages of gravity heating and circulation made it particularly advantageous for houses, small school buildings, churches, hails, etc., where a heat source may be placed near the bases of a warm air duct and where air flow resistance is low. However, unseparated air ducts in a gravity ventilation system often become inefficient due to stagnation if the duct's wall becomes exposed to cooler surrounding or adjacent air that induces downdrafts within the duct which collide with rising warmer air. Gravity air ducts that allow air to circulate simultaneously in opposite directions require very large cross-sections like an air well in multistory buildings. Also, it has been thought that using gravity for ventilation is more expensive than a fan because the amount of thermal energy required to produce a significant draft or air velocity through a duct greatly exceeds the electrical energy required to power a fan. Gravity air circulation may exhibit difficulty in moving hot air into certain rooms in a building during windy weather.

SUMMARY OF THE INVENTION

The present disclosure provides an improved ventilation duct.

An object of the present disclosure is to provide a gravity ventilation duct that is smaller than conventional gravity ventilation ducts.

Another object of the present disclosure is to provide a gravity ventilation duct that does not require a separate return duct.

Another object of the present disclosure is to provide a gravity ventilation duct that is easier to position within, a building and easier to install.

Another object of the present disclosure is to provide a gravity ventilation duct that requires only a single penetration through a building's floor/ceiling.

Another object of the present disclosure is to provide a gravity ventilation duct that avoids air flow stagnation.

Another object of the present disclosure is to provide a gravity ventilation duet that circulates air efficiently over longer lengths.

Another object of the present disclosure is to provide a gravity ventilation duct that is smaller and that uses duct cross-sectional area efficiently.

While the improved gravity ventilation duct is disclosed in the context of being installed in a building, the coaxial ventilator is also useful for ventilating tunnels, underground shelters, mineshafts, and the like.

Another object of the present disclosure is using passive evaporative cooling both throughout the day and especially at night.

Another object of the present disclosure is providing an improved thermal storage of nighttime "coolness" with enlarged heat and/or cool storage capacity.

Another object of the present disclosure is increasing the cooling capability of the coaxial ventilator without substantially increasing the physical fluid capacity.

Another object of the present disclosure is providing a passive, small sized, unobtrusive cooling or heating ventilator where the cooling or heating apparatus does not intrude into the space to be cooled or heated.

Another object of the present disclosure is collecting rainwater for use in evaporative cooling.

An advantage of the present disclosure is that in one exemplary embodiment, the disclosed system/method allows drawing via a drain tap collected rainwater as a backup for supplementary or emergency domestic water supply.

Another advantage of the present disclosure is that in one exemplary embodiment where the water pan is filled from the Municipal Water Mains thru a Float Valve (not illustrated in any of the figures), the present disclosure essentially combines the functions of a domestic water reservoir tank and a building cooler into one compact cost efficient device.

The disclosed coaxial ventilator is adapted for inclusion in a building for exchanging atmosphere between parts of the building at differing heights. The coaxial ventilator includes an outer conduit adapted for being juxtaposed with at least a portion the building selected from a group consisting of:
1. a roof;
2. a floor; and
3. a wall.

The outer conduit has a length that extends from an upper end thereof downward to a lower end thereof.

The coaxial ventilator also includes an inner conduit that is surrounded by the outer conduit, and extends substantially along the entire length of the outer conduit. Accordingly, an upper end and a lower end of the inner conduit are located near the upper end and lower end of the outer conduit.

Both the outer conduit and the inner conduit are open at the respective upper ends and lower ends thereof. Responsive to temperatures of atmosphere both surrounding and within the outer conduit and the inner conduit simultaneously:
1. atmosphere about the upper end of the outer conduit enters into one (1) of two (2) conduits selected from a group consisting of:
   a. the outer conduit; and
   b. the inner conduit; and
2. atmosphere within the coaxial ventilator exits into atmosphere about the upper end of the outer conduit from one (1) of two (2) conduits selected from a group consisting of:
   a. the inner conduit; and
   b. the outer conduit.

While the improved gravity ventilation duct is disclosed in the context of being installed in a building, the coaxial ventilator is also useful for ventilating tunnels, underground shelters, mineshafts, and the like.

These and other features, objects and advantages will toe understood or apparent to those of ordinary skill in the art from the following detailed description of the preferred embodiment as illustrated in the various drawing figures.

BRIEF DESCRIPTION OF THE DRAWINGS

To assist those of skill in the art in making and using the disclosed invention, reference is made to the accompanying figures, wherein:

FIG. 2 depicts the building of FIG. 1 illustrating day time operation of the coaxial ventilator in warm climate;

FIG. 3 is a cross-sectional plan view of the coaxial ventilator taken along the line 3-3 respectively in FIGS. 1 and 2;

FIG. 4 is a cross-sectional, elevational view depicting a building in which an alternative embodiment pair of coaxial ventilators in accordance with the present disclosure ventilate two (2) different rooms within the building during nighttime operation in warm climate;

FIG. 5 is a cross-sectional plan view of the twin coaxial ventilators of FIG. 4 taken along the line 5-5 therein;

FIG. 8 is a cross-sectional elevational view of the coaxial ventilator in accordance with the present disclosure, such as the coaxial ventilator depicted in FIG. 1, that includes a pair of turbines located respectively near the top and bottom thereof;

FIG. 9 is an enlarged cross-sectional elevational view depicting in greater detail one of the turbines depicted in FIG. 8;

FIG. 11 depicts a cross-sectional, elevational view of a portion of a building having a coaxial ventilator installed therein illustrating an alternative embodiment coaxial ventilator which includes a coaxial liquid-filled thermosyphon cooling tube descending downward from a covered pan for collecting rain water that is located above the building's roof at the top of the alternative embodiment coaxial ventilator and within an inner conduit thereof along a central axis of thereof;

FIG. 12 is a cross-sectional plan view of the thermosyphon cooling tube coaxial ventilator taken along the line 12-12 in FIG. 11;

FIG. 13B shows another aspect of the coaxial ventilator of FIG. 13, further including a solar-powered exhaust fan, an exhaust wind turbine, and hanging evaporative cooling mats;

FIG. 14 is an enlarged cross-sectional plan view of the coaxial ventilator taken along the lines 12-12 and 14-14 respectively in FIGS. 11 and 13;

FIG. 16 is an enlarged cross-sectional plan view of the coaxial ventilator taken along the line 16-16 in FIG. 15;

FIG. 18 depicts a cross-sectional, elevational view of a portion of a building having a coaxial ventilator installed therein that illustrates another alternative embodiment coaxial ventilator which includes multiple liquid-filled cooling tubes each of which respectively descends downward from the covered pan into an annularly-shaped space located between the inner conduit and an outer conduit of the coaxial ventilator;

FIG. 19 is a cross-sectional plan view of the thermosyphon multi cooling tube coaxial ventilator taken along the line 19-19 in FIG. 18;

FIG. 21 is a cross-sectional plan view of the upper hollow collar flange taken along the line 21-21 in FIG. 20.

DETAILED DESCRIPTION OF THE PRESENT INVENTION

Figure 1:
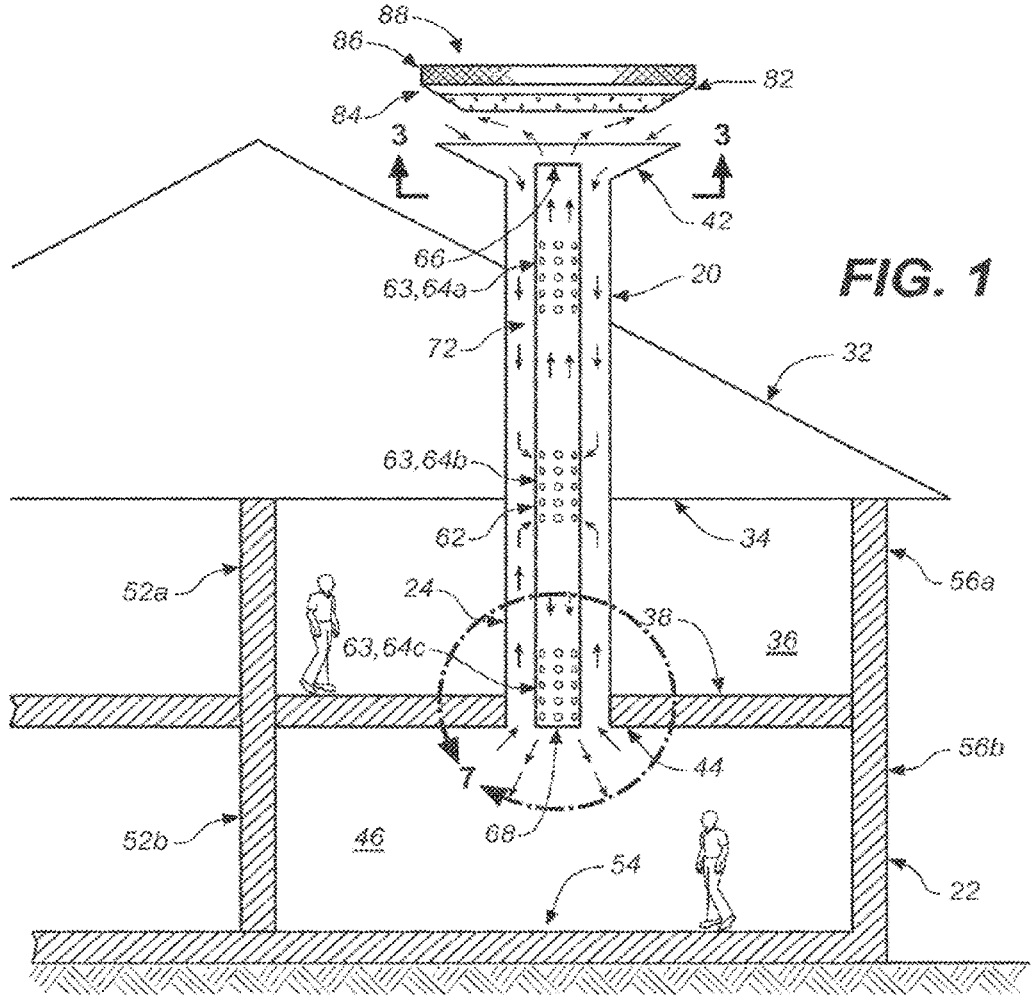
FIG. 1 is a cross-sectional, elevational view depicting a building having a coaxial ventilator in accordance with the present disclosure included therein illustrating the ventilator's nighttime operation in warm climate for transferring cooler air from outside a building into a lower room within the building.

FIGS. 1 and 2 depict a coaxial ventilator, identified by the general reference number 20, included in the structure of a building 22. The coaxial ventilator 20 includes an uninsulated outer conduit 24 made of a thermally conductive material that is juxtaposed with and, in the illustrations of FIGS. 1 and 2, passes through;
1. a roof 32;
2. a ceiling 34 of a warm upper story room 36; and
3. a floor 38 of the room 36.

The roof 32, the ceiling 34 and the floor 38 are ail respective portions of the building 22. As depicted in FIGS. 1 and 2, the outer conduit 24 of the coaxial ventilator 20 has a length that extends from a flared upper end 42 located above the roof 32 downward to a lower end 44 that is located at a lower room 46 of the building 22 beneath the room 36. In the illustrations of FIGS. 1 and 2 the building 22 also includes:
1. an upper interior wall 52a;
2. a lower interior wall 52b;
3. a floor 54 for the room 46 for which the floor 38 of the upper room 36 also provides a ceiling;
4. an upper exterior wall 56a; and
5. a lower exterior wall 56b.

The coaxial ventilator 20 also includes an inner conduit 62 made of a thermally insulative material which may be flexible and/or corrugated that is:
1. surrounded by the outer conduit 24;
2. extends substantially along the entire length of the outer conduit 24; and
3. is pierced by a plurality of holes 63 at locations 64a, 64b and 64c where transitions occur in temperature about the outer conduit 24.

An upper end 66 of the inner conduit 62 is preferably located slightly below the top of the flared upper end 42 of the outer conduit 24. Preferably, a lower end 66 of the inner conduit 62 is similarly recessed slightly above the lower end 44 of the outer conduit 24. Consequently, the inner conduit 62 has a slightly shorter length than that of the outer conduit 24.

As depicted most clearly in FIG. 3, the presence of the inner conduit 62 centered within the outer conduit 24 establishes an annularly-shaped space 72 therebetween that extends along the length of the inner conduit 62. Cross-sectional areas of the inner conduit 62 and the annularly-shaped space 72 should be approximately equal with the cross-sectional area of the annularly-shaped space 72 being slightly larger to compensate for air friction with both the outer conduit 24 and the inner conduit 62.

While FIG. 3 depicts the inner conduit 62 as being centered within the outer conduit 24, that is not an essential requirement for the coaxial ventilator 20. The coaxial ventilator 20 works well if the inner conduit 62 were to be displaced to one side within the outer conduit 24. The inner conduit 62 may not foe centered within the outer conduit 24 if, for example, the inner conduit 62 were loosely fixed or not secured at the very center of the outer conduit 24 perhaps to facilitate fabricating the coaxial ventilator 20 or adjustment of inner conduit 62 etc., or if at some locations within the building 22 the coaxial ventilator 20 is inclined, i.e. not vertical.

If the inner conduit 62 is insecurely positioned within the outer conduit 24 and the coaxial ventilator 20 is inclined, the inner conduit 62 may sag or hang against a lower wall of the outer conduit 24. Under such a circumstance, inner conduit 62 may contact the outer conduit 24 but because the inner conduit 62 is thermally insulated, i.e. does not conduct heat well, and contact area is small, little heat will be transferred, from the outer conduit 24 to the inner conduit 62 thereby preserving a temperature difference between the outer and inner conduits 24, 62. Accordingly, the coaxial ventilator 20 works regardless of whether the inner conduit 62 is at the exact center of the outer conduit 24 or displaced to one side thereof.

In fact, displacing the inner conduit 62 greatly to one side of the outer conduit 24 lowers airflow resistance between the outer and inner conduits 24, 62. Displacing the inner conduit 62 to one side of the outer conduit 24 forces most of the airflow between the outer and inner conduits 24, 62 into a more cohesive "fat" crescent cross-sectional shape, with the major portion of the air flow occurring in the "fat" center of the crescent. If most of the air flow occurs in the "fat." center of the crescent, the air flow sore nearly approximates that of an ideal circular cross-sectional shape. Approaching more nearly to an ideal circular cross-sectional air flow minimizes friction with the outer and inner conduits 24, 62 in comparison with the thinner, strictly perfectly annular shape of airflow along the annularly-shaped space 72 having the same cross-sectional area. To reduce friction due to stagnant "dead" space at the sharp "horned" ends of a crescent cross-sectional shape near where the inner conduit 62 contacts the outer conduit 24, the cross-sectional area between the outer and inner conduits 24, 62 can be increased to be slightly larger than the cross-sectional area of the inner conduit 62.

As depicted in FIG. 1, the coaxial ventilator 20 may also include a cover 82 disposed above the flared upper end 42 of the outer conduit 24. Among other functions described in greater detail below, the cover 82 occludes upper ends 42, 66 both of the outer conduit 24 and of the inner conduit 62 thereby preventing precipitation from entering thereinto.

The outer conduit 24 of the coaxial ventilator 20 is highly heat absorbent and heat radiative such as being fabricated with a matt black absorptive and radiative surface. The inner conduit 62 is preferably made of heat insulating material. A length of the coaxial ventilator 20 passing through a warmer area of the building 22, such as the room 36 in FIG. 1, is warmed thereby heating air within a segment of the annularly-shaped space 12 that spans the room 36. As depicted in FIG. 1 by small upwardly directed arrows in the annularly-shaped space 72 below the location 64b, warmer air within the annularly-shaped space 72 spanning the room 36 rises while cooler air within a segment of the inner conduit 62 spanning the room 36 descends. Above a zone in which a transition in temperature about the outer conduit 24 occurs, such as that during nighttime surrounding the location 64a in FIG. 1, lower temperature atmosphere about the outer conduit 24 cools air within the annularly-shaped space 72 above the roof 32. In a length of the coaxial ventilator 20 being cooled by the surrounded atmosphere, as depicted in FIG. 1 by small downwardly directed arrows within the annularly-shaped space 72 above the location 64b, cooler air descends while warmer air in the inner conduit 62 above the location 64a rises.

At a location along the length of the coaxial ventilator 20 where rising warmer air within the annularly-shaped space 72 meets descending cooler air within the annularly-shaped space 72 such as at the location 64b, an exchange of air occurs between the annularly-shaped space 72 and the inner conduit 62 with:

1. cooler descending air flowing through the holes 63 piercing the inner conduit 62 at the location 64b into the inner conduit 62; and
2. warmer rising air flowing through the holes 63 piercing the inner conduit 62 at the location 64b into the inner conduit 62.

After flowing from the annularly-shaped space 72 into the inner conduit 62, the descending cooler air continues descending within the inner conduit 62 below the location 64b while the rising warmer air continues rising within the inner conduit 62 above the location 64b. As depicted in FIG. 1, in this way warmer air first rises from the room 46 in the building 22 initially via the annularly-shaped space 72 and subsequently via the inner conduit 62 to exit the coaxial ventilator 20 at the top thereof. Conversely, cooler air initially enters the annularly-shaped space 72 at the flared upper end 42 of the outer conduit 24 to flow downward before entering the room 46 via the inner conduit 62.

The locations 64a, 64b and 64c where holes 63 pierce the inner conduit 62 promote formation of transition zones inside the coaxial ventilator 20 where air flowing in the annularly-shaped space 72 may enter into the inner conduit 62 and conversely. There exists a tendency for exchanges of air to occur between the annularly-shaped space 72 and the inner conduit 62 where the coaxial ventilator 20 passes through the exterior of the building 22 such as at the roof 32. A tendency exists for flow exchanges of air wherever a change in temperature occurs along the length of the coaxial ventilator 20, i.e. where the coaxial ventilator 20 passes from one thermal environment to another thermal environment.

The cover 82 of the coaxial ventilator 20 may be advantageously configured for evaporatively cooling air entering the flared upper end 42 of the outer conduit 24 by including at the bottom thereof, spaced a distance above the flared upper end 42 of the outer conduit 24, a water filled pan 84. The cover 82 preferably also includes a mesh 86 that spans between peripheries of the pan 84 and a dish-shaped top lid 88. Preferably the lid 88 is opaque and reflective to reduce solar heating. The mesh 86 prevents insects from entering the space between the pan 84 and the lid 88 while permitting atmosphere about the flared upper end 42 of the outer conduit 24 to circulate therethrough. A depression 89 in the lid 88, preferably at the center thereof, with a drip hole 90 formed therethrough, best illustrated in FIGS. 13, 15, 17 and 20, permits collecting rain water used for filling the pan 84.

In the illustration of FIG. 2, the building 22 and the coaxial ventilator 20 are identical to those depicted in FIG. 1. The difference between FIGS. 2 and 1 are that the small arrows within the annularly-shaped space 72 and the inner conduit 62 differ from those in FIG. 1 since the small arrows in FIG. 2 depict the path of air as it flows during daytime. The principal difference between nighttime and daytime airflows is that during daytime there is no exchange of air between the annularly-shaped space 72 and the inner conduit 62. Rather, during daytime warmer air rises along the entire length of the annularly-shaped space 72 while cooler air descends along the entire length of the inner conduit 62.

FIGS. 4 and 5 illustrate an alternative embodiment of the present disclosure in which a pair of coaxial ventilators 20a, 20b in accordance herewith ventilate two (2) different rooms 46a, 46b during nighttime operation. Those elements depicted in FIGS. 4 and 5 that are common to the coaxial ventilator 20 depicted in FIGS. 1-3 carry the same reference numeral distinguished by a prime ("'") designation. Lower segments of each of the coaxial ventilators 20a, 20b are juxtaposed with opposite sides of the interior wall 52a'. As illustrated in FIGS. 4 and 5, above the roof 32' the pair of coaxial ventilators 20a, 20b preferably share a single cover 82'.

Figure 6:
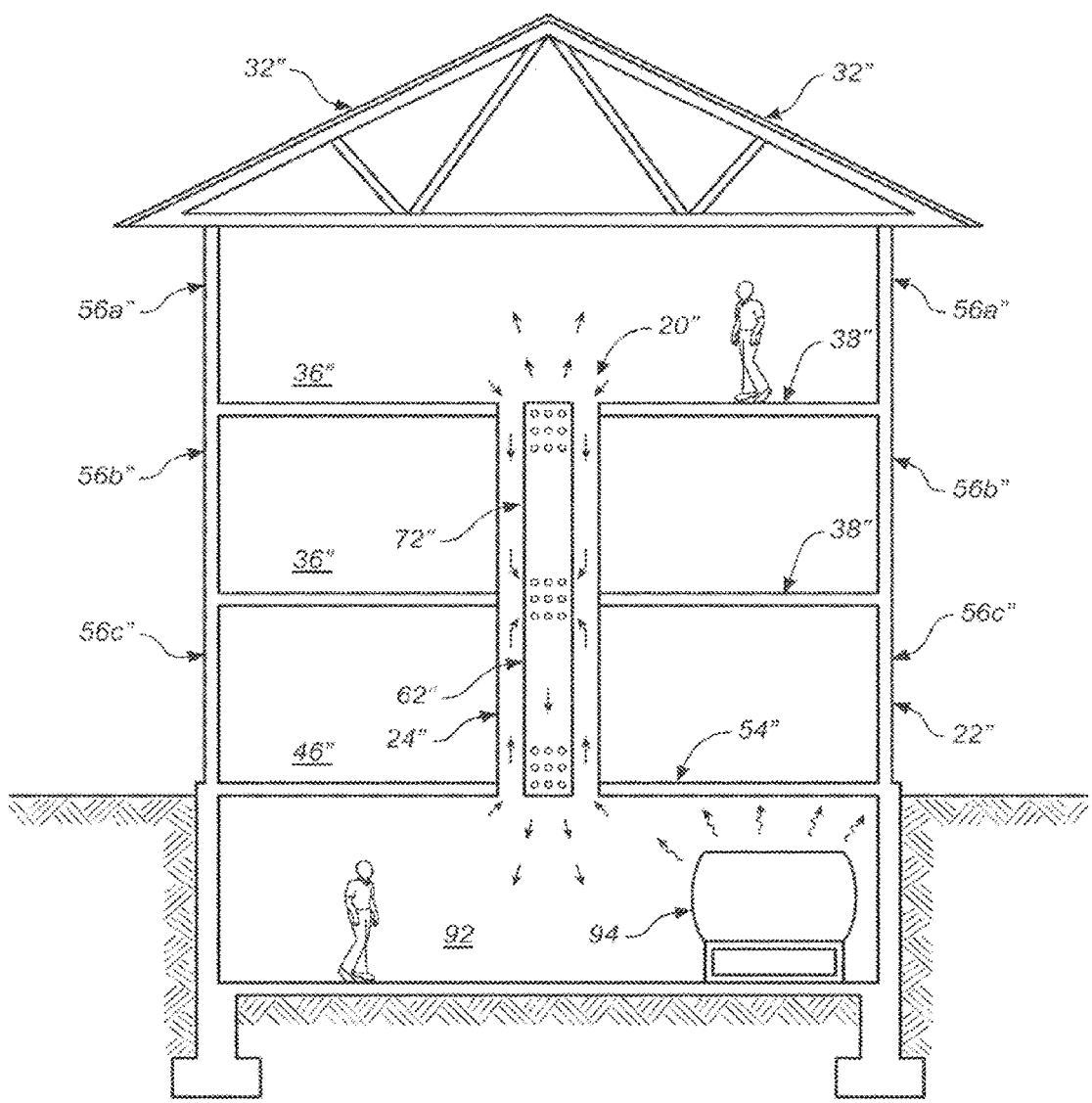
FIG. 6 is a cross-sectional, elevational view depicting yet another alternative embodiment coaxial ventilator located in a multi-story building in a cold climate for transferring warmer air from a heated room at the bottom of a building, e.g. a basement, to an upper room within the building.

FIG. 6 illustrates yet another alternative embodiment of the present disclosure located in a multi-story building 22". Those elements depicted in FIG. 6 that are common to the coaxial ventilator 20 depicted in FIGS. 1-3 carry the same reference numeral distinguished by a double prime ("''") designation. The building 22" includes a basement 92 having a heat source 94, i.e. a boiler or other warm appliance, located therein. Radiation and thermal convection within the basement 92 warms the room 46" through the floor 54". As depicted in FIG. 6, a coaxial ventilator 20" extends from the basement 92 upward to a cooler upper room 36". Convection, of warmer air via the coaxial ventilator 20" between the basement 92 and the room 36" warms the room 36" while cooler air descends from the room 36" to the basement 92.

Figure 7:
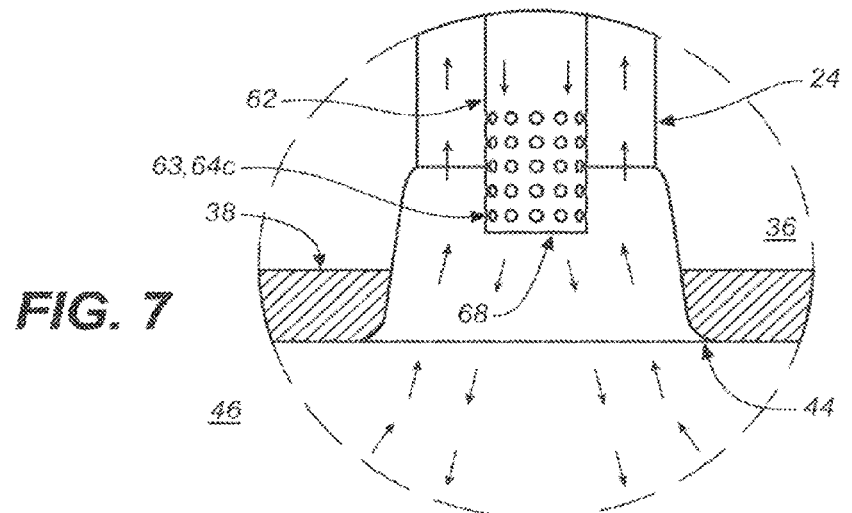
FIG. 7 is a cross-sectional elevational view of a lower end of the coaxial ventilator illustrated in FIG. 1 depicting a preferred bell shaped flaring at the lower end of the ventilator's outer conduit.

FIG. 7 depicts a preferred bell-shaped flaring 98 of the lower end 44 of the outer conduit 24. Preferably, as stated previously the lower end 68 of the inner conduit 62 is recessed slightly above the lower end 44 of the outer conduit 24. As depicted in FIG. 7, the bell-shaped flaring 98, essentially forming a funnel, begins slightly above the lower end 68 of the inner conduit 62 and above the floor 38 of the room 36. The bell-shaped flaring 98 may be advantageously shaped to exploit the Coanda effect both for separating the upward flow of warmer air from the downward flow of cooler air, and for drawing the rising upward flow from a larger horizontal area around the lower end 44 of the outer conduit 24. The funnel formed by the preferred, bell-shaped flaring 98 at the lower end 44 reduces drag and turbulence. Formed in this way the bell-shaped flaring 98 establishes a transition zone having a wider space for stabilizing the upward flow of warmer air and downward flow of cooler air and interference between them.

Industrial Applicability

Figure 10:
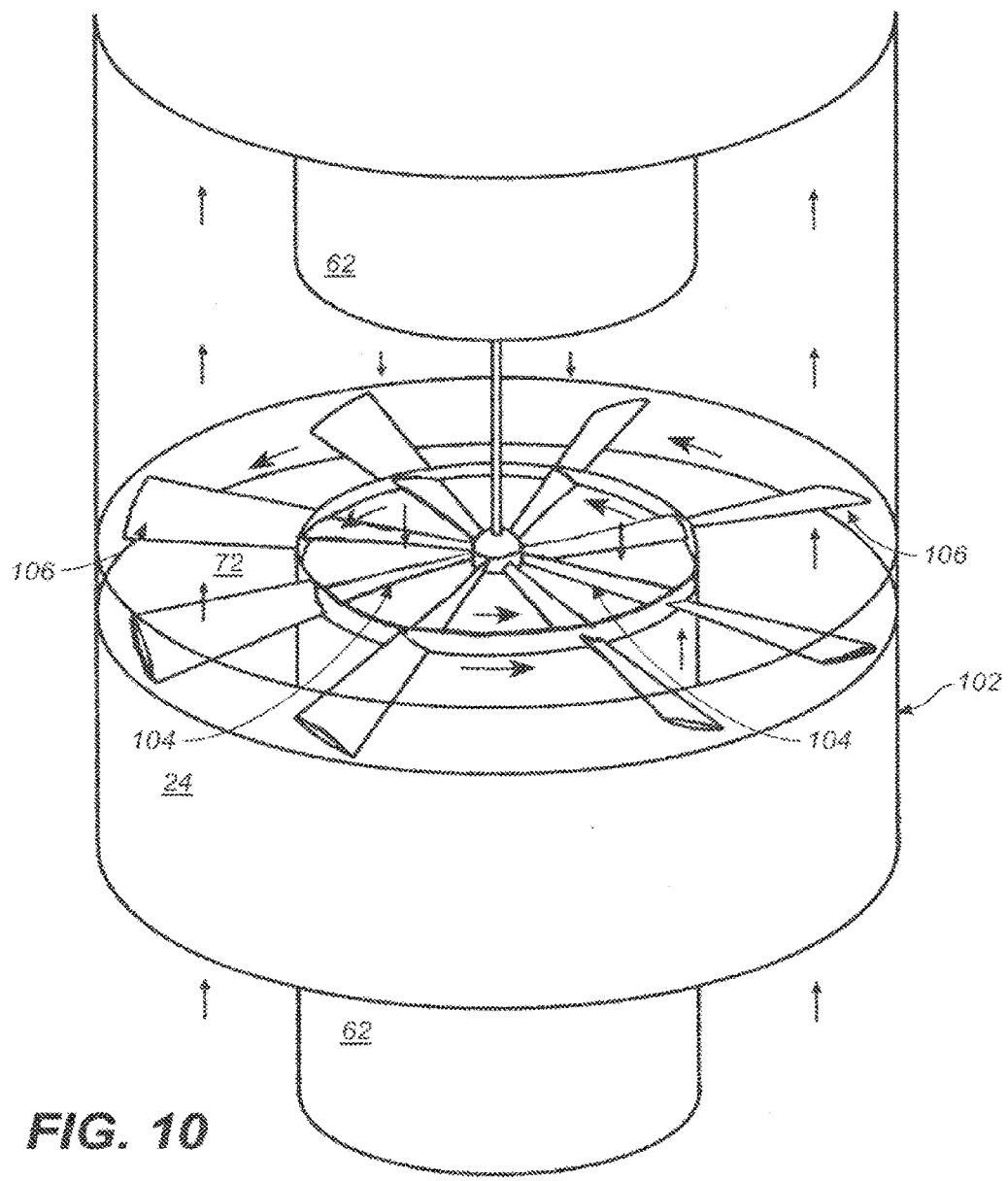
FIG. 10 is a perspective view taken along the line 10-10 in FIG. 9 depicting in greater detail the turbine depicted in FIG. 8.

FIGS. 8 through 10 illustrate the coaxial ventilator 20 being used advantageously for power production such as generating electricity. In the illustration of FIG. 8, two (2) turbines 102 are located within the coaxial ventilator 20 respectively near the top and bottom thereof. The turbines 102 are located, in sections of the coaxial ventilator 20 in which the inner conduit 62 lacks holes 63 and where there is maximum flow and pressure differential to drive the turbines 102. While FIG. 8 depicts only two (2) turbines 102, it is readily apparent that depending upon construction details a single coaxial ventilator 20 may include more or fewer than two (2) turbines 102.

As depicted in FIGS. 9 and 10, inner turbine blades 104 upon which cooler air descending through the inner conduit 62 impinges preferably slant in a direction opposite than outer turbine blades 106 upon which hotter air rising through the annularly-shaped space 72 impinges. Configured in this way, both the descending cooler air and the rising hotter air urge the turbine 102 to rotate in the same direction. Preferably, to advantageously exploit the Coriolis effect the slant direction of the inner turbine blades 104 and the outer turbine blades 106 differs depending upon whether the turbine 102 is located in the Northern Hemisphere or Southern Hemisphere. Advantageously, the slant of the inner turbine blades 104 and the outer turbine blades 106 may change automatically thereby adapting them for differing air flow pressure and velocities occurring throughout the day.

Referring back to FIG. 8, during daylight hours solar heating of air within the room 46 and the outer conduit 24 provides energy for driving the turbines 102 by heating and expanding air therein. The air pressure increase associated with solar heating and expansion enhances the updraft in annularly-shaped space 72 between the outer conduit 24 and the inner conduit 62 before the air escapes from the upper end 42. Note that solar radiation impinging upon the outer conduit 24 heats air within the annularly-shaped space 72. Accordingly, for this particular application it is advantageous to increase the height of the coaxial ventilator 20 that extends above the roof 32. If during night time the air flows within the coaxial ventilator 20 reverse the turbines 102 correspondingly reverse rotation which still provides power for generating electricity.

Rotation of the turbine 102 by hotter air impinging upon the outer turbine blades 106 rotates the inner turbine blades 104 thereby drawing cooler air into the inner conduit 62 to thereby increase the natural descent of cooler air within the inner conduit 62 and compress air within the room 46. After air flow, within the coaxial ventilator 20 becomes stable for instance during daytime, the increased flow rates produced by solar heating will be sufficient to overcome any slight back pressure due to increased air pressure within the room 46.

Daytime power production efficiency may be increased by including a non return valve, not illustrated in FIGS. 8-10, at the lower end 68 of the inner conduit 62. Such a non return valve increases daytime efficiencies by preventing reverse flow through the inner conduit 62. However, including such a non return valve also prevents the flow directions within the coaxial ventilator 20 from reversing for producing power during the night.

While less preferred and not illustrated in FIGS. 8-10, the turbines 102 may instead include two (2) independent sets of contra-rotating blades 104, 106 both of which sets slant in the same direction. Because such inner turbine blades 104 and outer turbine blades 106 rotate in opposite directions, generating electricity with a single generator requires coupling the blades 104, 106 together with a mechanical transmission. Alternatively, electricity might be generated using two separate generators respectively coupled independently to the inner turbine blades 104 and to the outer turbine blades 106.

Alternatively, if electricity is supplied to the turbines 102 rather than being drawn therefrom, then the turbines 102 can be used advantageously for boosting air flow through the coaxial ventilator 20.

Figure 8A:
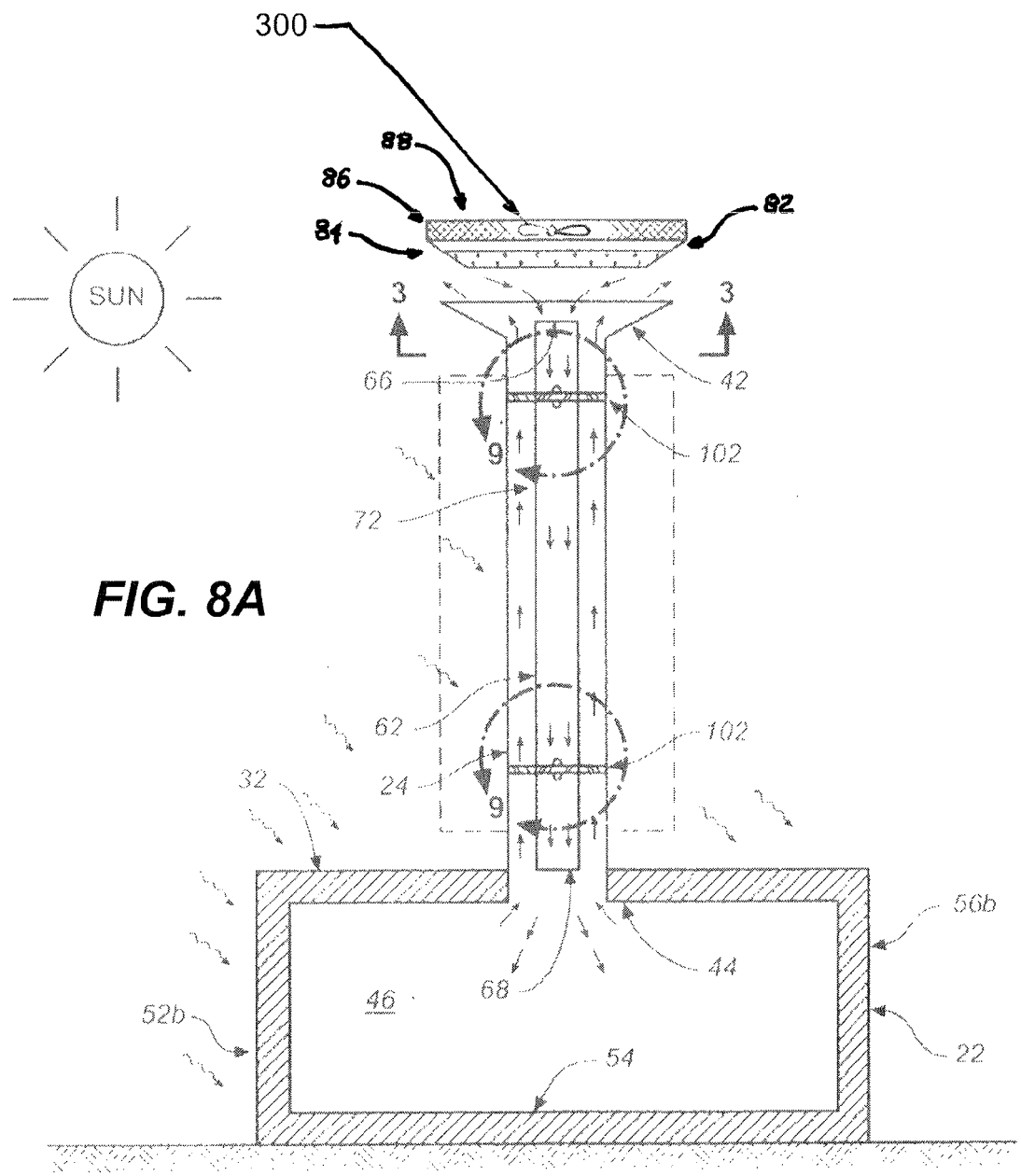
FIG. 8A shows another aspect of the coaxial ventilator according to the present disclosure, further including an exhaust fan.

Another aspect of coaxial ventilator 20 is illustrated in FIG. 8A and further includes a weatherproof exhaust or circulation fan 300, positioned above the water pan 84, for increasing the evaporative heat loss rate from the water pan 84, and thereby increasing the cooling capacity of the coaxial ventilator 20, by creating a wind current across the water surface. This embodiment is particularly advantageous for increasing evaporative heat loss on windless days and could lower the temperature of the water in the water pan 84 by as much as, for example, an additional 8° F. (4° C.). The weatherproof exhaust fan 300 could be powered by solar photovoltaic cells (not shown) mounted on the lid 88. Other methods for increasing the evaporative rate from the water pan 84 include, but are not limited to, spraying the water from the water pan 84 upwards into the air or sprayed upwards onto wetted fabric mats, or by natural water capillary wicking action upwards from the water pan 84 onto fabric or mesh mats suspended above, and partially submerged into, the water pan 84, thereby increasing the evaporative surface area (see for example, FIG. 13B, discussed hereinbelow). Small water pumps used for spraying the water out of the water pan 84 could be powered by solar photovoltaic cells (not shown) mounted on the lid 88. The sprayed water, having been cooled by evaporative cooling, would then drip back down into the water pan 84, thereby reducing the temperature of water in the water pan 84.

An alternative embodiment coaxial ventilator 20 depicted in FIGS. 11, 12, 13, 13A, 13B and 14 further includes a liquid-filled thermosyphon cooling tube 124 that depends beneath a pan 84 into an inner conduit 62 of the coaxial ventilator 20. In the illustrations of FIGS. 11, 12, 13, 13A, 13B and 14, the cooling tube 124 descends along a central axis of the coaxial ventilator 20 to be thereby surrounded by the inner conduit 62. Disposed as depicted in FIGS. 11, 12, 13, 13A, 13B and 14, the cooling tube 124 advantageously increases contact area for heat exchange cooling significantly between:

1. water evaporating from a pan 84 located at the top of the coaxial ventilator 20; and
2. air within, the coaxial ventilator 20 about the liquid-filled thermosyphon cooling tube 124.

In the embodiment depicted in FIGS. 11, 12, 13, 13A, 13B and 14, the cooling tube 124 is filled with water 126 drawn from the pan 84. A drain, tap 128 located at the bottom of the cooling tube 124 permits drawing collected rainwater as a backup for supplementary or emergency domestic water supply. The cooling tube 124 is preferably made of copper or similarly high thermal conductivity material, and maybe be finned or corrugated with heat conducting surfaces to increase the surface area for heat exchange, or alternatively be of semi-permeable surfaces to increase the surface area for water evaporation cooling.

Adding a liquid-filled thermosyphon cooling tube 124 that includes a perforated inner return tube, such as that described in U.S. Pat. No. 6,014,968 and hereby incorporated by reference as though fully set forth here, to the coaxial ventilator 20 depicted in FIGS. 1-3 effectively elongates the heat exchange area of the evaporative cooling water-filled pan 84. Effectively elongating the heat exchange area of the evaporative cooling water-filled pan 84 in this way increases cooling capacity of a coaxial ventilator 20 without significantly increasing the overall size of the coaxial ventilator 20. Extending the heat exchange area of the coaxial ventilator 20 by including the thermosyphon cooling tube 124 therein increases heat exchange efficiency between air within the coaxial ventilator 20 and evaporative cooling water-filled pan 84.

Figure 13:
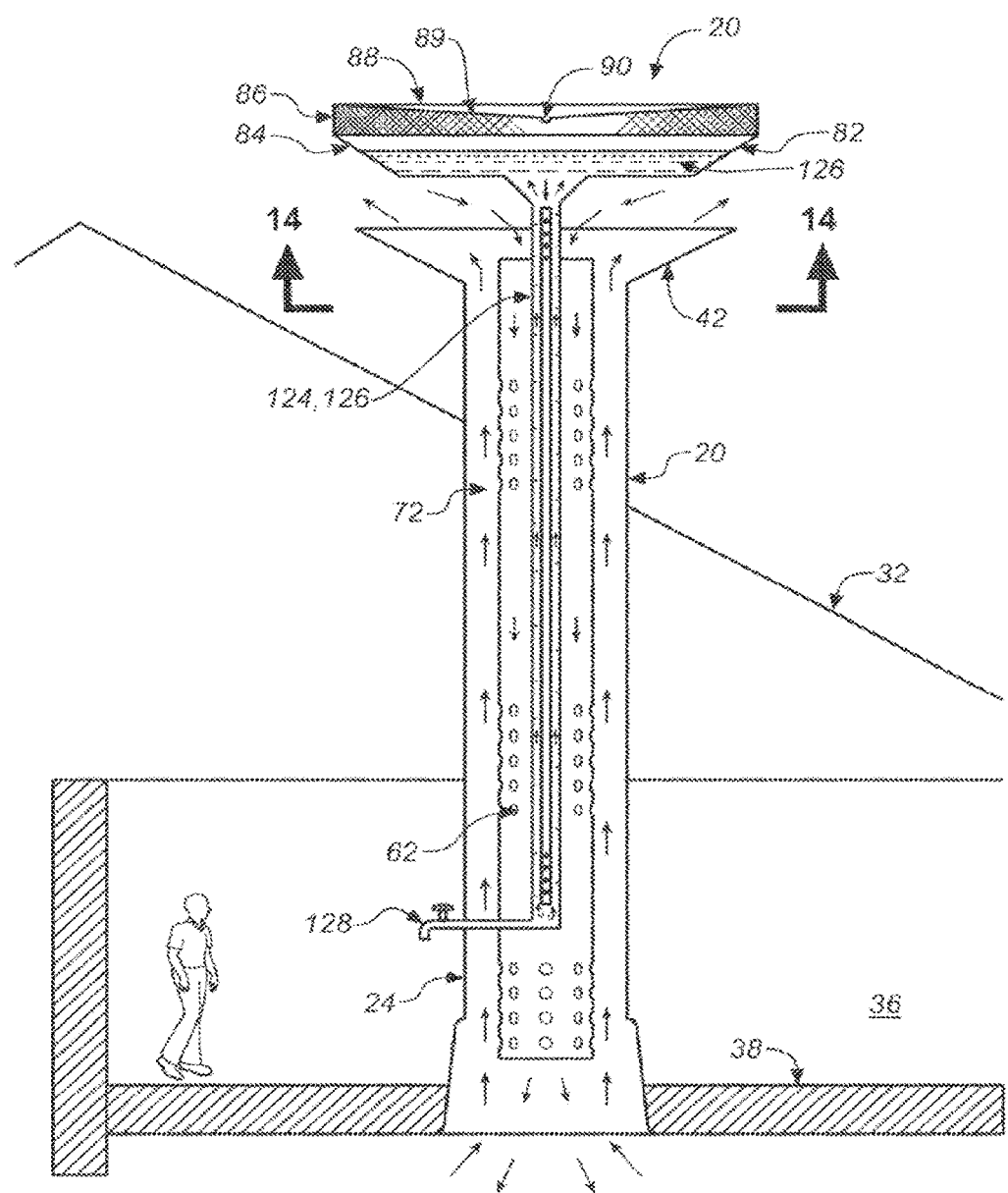
FIG. 13 is an enlarged cross-sectional view of the thermosyphon cooling tube coaxial ventilator depicted in FIG. 11 filled with water from a covered pan located at the top of the thermosyphon cooling tribe coaxial ventilator.
Figure 13A:
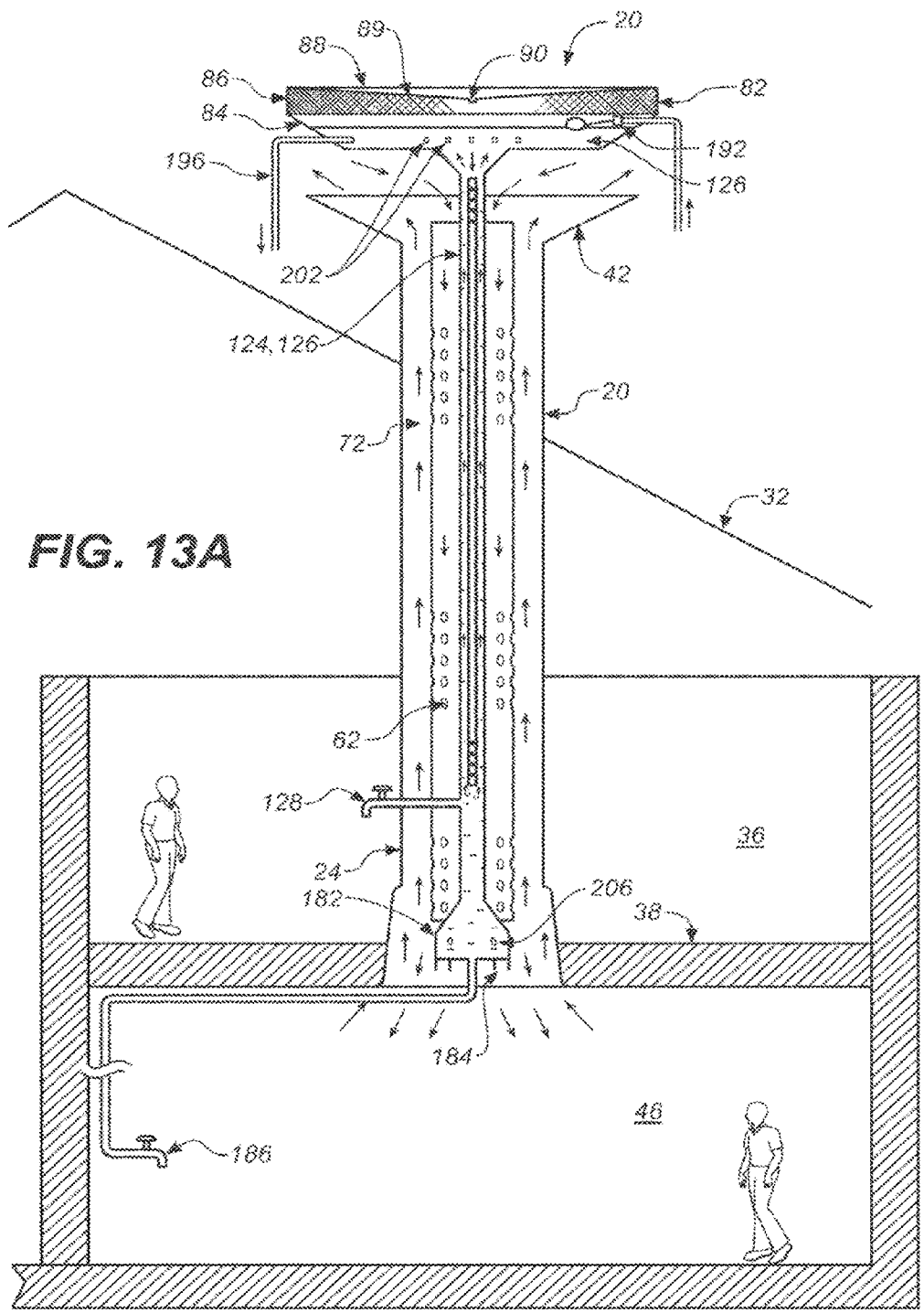
FIG. 13A illustrates the coaxial ventilator depicted in FIG. 13 that has an alternative embodiment water filled thermosyphon cooling tube that includes a bulb tank located at a lower end of the thermosyphon cooling tube.

FIG. 13A illustrates the coaxial ventilator 20 depicted in FIG. 13 having an alternative embodiment water filled thermosyphon cooling tube 124. The cooling tube 124 depicted in FIG. 13A differs from the cooling tube 124 depicted in FIG. 13 by:

1. extending further downward beneath a lower end of the inner conduit 62; and
2. having an enlarged lower end that forms a bulb tank 182.

As depicted in FIG. 13A, the bottom of the bulb tank 182 may include projecting neat exchanging fins 184 for cooling surrounding atmosphere. The bulb tank 182 advantageously enlarges the cooling surface area and storage capacity of the cooling tube 124, as well as facilitating direct radiative, conductive and convective cooling into atmosphere surrounding the bulb tank 182 such as to the room 46 depicted in FIG. 13A similar to a radiative cooling ceiling panel. This increases the storage capacity of the cooling tube 124, and betters the coaxial ventilator 20 when used for water storage for the building 22 perhaps thereby avoiding additional expense of a separate water storage tank. When used for water storage, the lower end of the bulb tank 182 includes a drain tap 186, either alone or in addition to the drain tap 128. The bulb tank 182 as depicted in FIG. 13A and described above can be adapted for use in other configurations of the coaxial ventilator 20 disclosed herein which include the cooling tube 124.

As also illustrated in the embodiment of the coaxial ventilator 20 depicted in FIG. 13A, the pan 84 atop the coaxial ventilator 20 may also advantageously include an inlet float valve 192 connected to a water main supply not separately depicted in the figure. Attaching the inlet float valve 192 to the pan 84 ensures that the pan 84 at all times remains full of water, and cooler water flowing thereinto advantageously reduces the temperature of water in the pan 84. The embodiment of the coaxial ventilator 20 depicted in FIG. 13A also includes an outlet pipe 196 that advantageously permits drawing warm water from the pan 84.

In hot climates during daytime, drawing water from the outlet pipe 196 at the top of the pan 84 enables supplying preheated warm water:
1. for household use; or
2. to a household's water heater.

Moreover, cooler refill water entering the pan 84 through the inlet float valve 192 lowers the temperature of water in the pan 84 thereby maintaining cooling efficiency of the water pan 84. Otherwise, on hot afternoons excess heat collected in the water pan 84 may not be dissipated quickly enough thru evaporation. The presence of a warm water layer in the water pan 84 may reduce evaporative cooling of the water due to mixing of water cooled by evaporation sinking below the water's surface.

As depicted in FIG. 13A the embodiment of the coaxial ventilator 20 shown there may also advantageously include, respectively, a heat exchanger coil 202 located in the pan 84, and a heat exchanger coil 206 located in the bulb tank 182. At various times of the day as appropriate, the heat exchanger coils 202 and 206 are useful for warming or cooling pressurized fluid flowing respectively through the heat exchanger coils 202 and 206. For example, during very hot afternoons preheated warm water can be drawn from the pan 84 via the outlet pipe 196 or thru the heat exchanger coil 202 in the pan 84 before being heated further in a water heater not depicted in any of the figures.

Similarly, when excess cool water is present in the bulb tank 182 the heat exchanger coil 206 may be used for precooling a household air conditioner's refrigerant before it enters the conditioner's compressor or condenser not depicted in any of the figures. Within the coaxial. ventilator 20, water heated in this way rises through the cooling tube 124 to the pan 84 where it may heat fluid flowing through the heat exchanger coil 202. Heat transferred in this way from the bulb tank 182 to the pan 84 reduces energy consumed by a household's air conditioner and water heater.

FIG. 13B shows another aspect of the coaxial ventilator 20 depicted in FIG. 13A further including a vertical axis exhaust wind turbine 400, a weatherproof exhaust fan 402, and evaporative cooling wetted fabric mats or mesh 404. While both the wind turbine 400 and the exhaust fan 402 accelerate evaporative airflows across the water pan 84 surface to increase evaporative heat loss, the coaxial ventilator 20 could also include evaporative cooling wetted fabric mats or mesh 404 that are suspended above and partially submersed in the water pan 84. The fabric mesh 404 is wetted by way of capillary wicking action, or spraying by water pumps (not shown), thereby increasing the evaporative cooling surface area and thus, increasing the evaporative cooling rate. The wind turbine 400, the exhaust fan 402, and the water pumps could be powered by photovoltaic cells and/or batteries (not shown) that can be mounted to either the lid 88 of the coaxial ventilator 20, to a top surface of the wind turbine 400, or positioned at another suitable location. The exhaust fan 402 and the exhaust wind turbine 400 both function to accelerate the evaporative air flows across the water surface, exhausting the humid air up and out of the water pan 84 area and drawing in fresh dry air, thereby increasing the evaporative cooling rate. The blades of the exhaust wind turbine 400 are positioned at an angle facing outwards, such that the blades catch the wind, causing the exhaust wind turbine to rotate by the force of the wind. The blades may be aerodynamically formed such that the movement of the blades pushes air outwards horizontally, creating a low pressure area behind the blades on the inside of the exhaust wind turbine, drawing humid air out from above the water pan 84. The exhaust fan 402 and exhaust wind turbine 400 can include propeller and impeller blades, respectively, that are freely movable when they are not powered, so that they will spin freely, relative to one another, and not impede operation of each other when one is working and the other is not. Alternatively, the propeller blades of the exhaust fan 402 and the impeller blades of the exhaust wind turbine 400 could be coupled together so that they both turn in unison, when appropriately geared. Accordingly, when the impeller of the wind turbine 400 and propeller of the exhaust fan 402 are coupled together, the solar photovoltaic cells and/or batteries could be used to drive both the exhaust fan 402 as well as the exhaust wind turbine 400 while only providing power to one of the wind turbine 400 or exhaust fan 402. Similarly, wind could drive both the exhaust wind turbine 400 as well as the exhaust fan 402. It should be noted that the coaxial ventilator of the present embodiment need not include both the wind turbine 400 and the exhaust fan 402, and if there is no wind turbine 400, the exhaust fan 402 could be operated in either an exhaust or intake mode.

The coaxial ventilator 20 depicted in FIGS. 11, 12, 13, 13A and 14 passively, cost effectively, and space efficiently uses evaporating rain water to capture and store nighttime "coolness" for use during mornings and afternoons when it is most needed. During dry weather, any rain water collected in the pan 84 can be augmented by connecting a float valve controlled piped water supply to the upper evaporative cooling water-filled pan 84 (not illustrated in any of the figures). While evaporative cooling occurs continuously throughout an entire day, however temperatures are coolest at night, i.e., over 10 hours of nighttime evaporative cooling on average, Consequently, there exists ample time during that 10 hour interval to cool water in the pan 84 down to nighttime temperatures.

However, holding a sufficient quantity of water both for daytime cooling needs, particularly to store nighttime cooling capacity, and for providing sufficient evaporative heat exchange surface area, requires a quite large, heavy and unwieldy water-filled pan 84 that is located above a building's roof. Frequently, without a large pan 84 there is insufficient thermal storage capacity to extend nighttime "coolness" well into the afternoons, and insufficient heat exchange area to transfer heat into air descending down into the coaxial ventilator 20.

If a coaxial ventilator 20 is being used for supplying water to the building 22, the drain tap 128 may connect to the cooling tube 124 at any height along the length of the cooling tube 124. As those skilled in the art will recognize, connecting the drain tap 128 to the cooling tube 124 higher along the cooling tube 124 nearer to the pan 84 reduces the water pressure at the drain tap 128 in comparison with water pressure at a drain tap 128 connected to the cooling tube 124 lower along the cooling tube 124 nearer to the bulb tank 182. The location of the drain tap 128 along the length of the cooling tube 124 also affects the temperature of water drawn from the drain tap 128. During daytime, water drawn from a drain tap 128 connected to the cooling tube 124 higher along the cooling tube 124 nearer to the pan 84 will, in general, be warmer than water drawn from a drain tap 128 connected to the cooling tube 124 lower along the cooling tube 124 nearer to the bulb tank 182. During daytime, the warmest water may be drawn from a drain tap 128 located nearest to the pan 84. In a hot climate, to preserve cold water stored overnight undisturbed at the bottom of the bulb tank 182 for cooling the building 22, it is advantageous to avoid drawing water from the drain tap 186 but rather to draw water from a drain tap 128 located at an intermediate height along the cooling tube 124.

Figure 15:
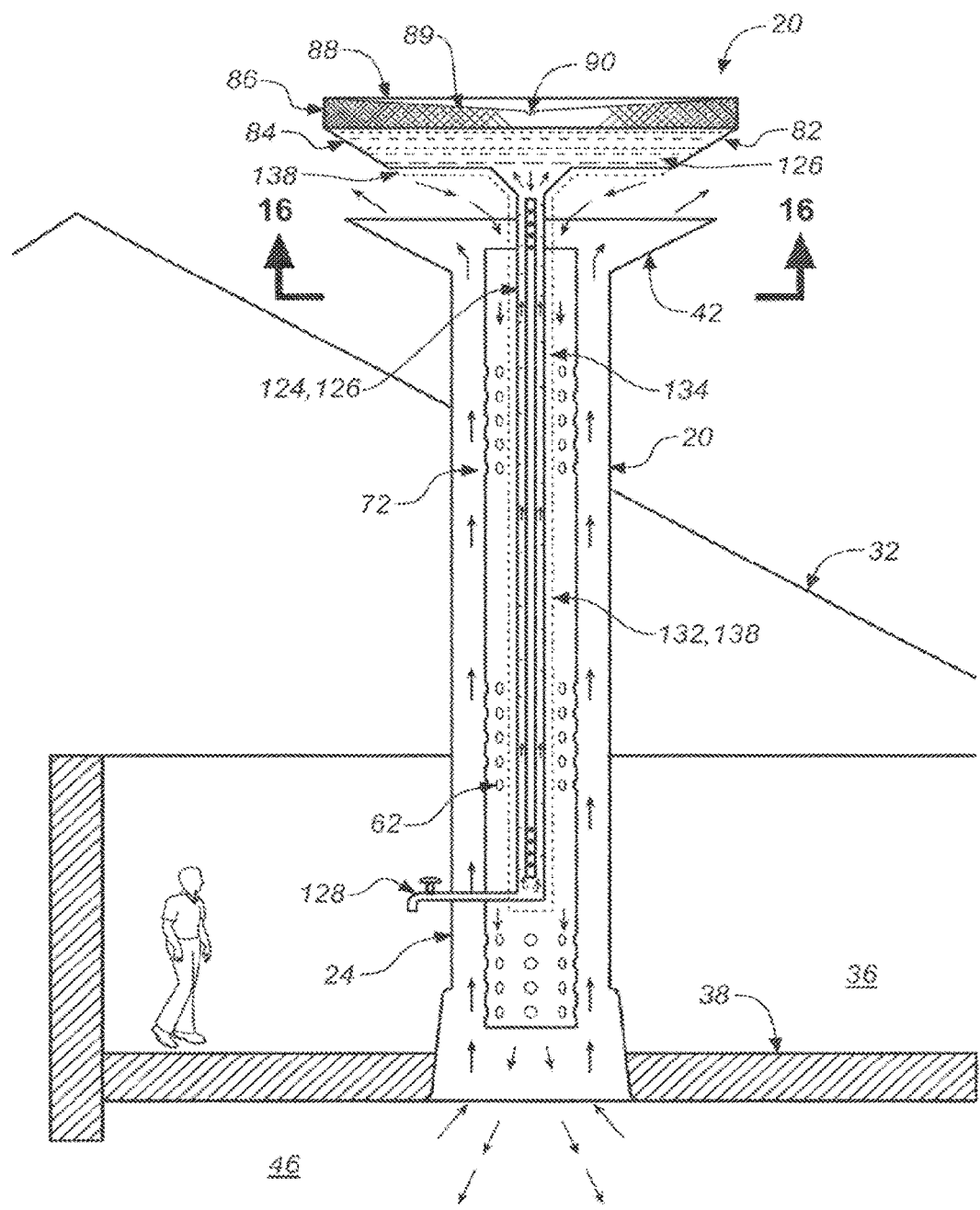
FIG. 15 is an enlarged cross-sectional view of the thermosyphon cooling tube coaxial ventilator illustrated in FIG. 13 depicting an alternative embodiment thereof in which a tube surrounds the coaxial liquid filled cooling tube establishing an annularly-shaped space thereabout that is filled with oil or other liquid that has a specific heat greater than that of water thereby increasing thermal storage capacity of the thermosyphon cooling tube coaxial ventilator.

FIGS. 15 and 16 depict an alternative embodiment of the coaxial ventilator 20 depicted in FIGS. 11, 12, 13, 13A and 14. In the embodiment depicted in FIGS. 15 and 16 the water-filled thermosyphon cooling tube 124 below the pan 84 is surrounded by a tube 132 illustrated by a dashed line in those FIGS. The tube 132:
1. preferably has a circular cross-section;
2. preferably is made of copper or similarly high thermal conductivity material to enhance heat exchange between liquids filling the tube 132 and the cooling tube 124; and
3. may be flexible, finned or corrugated.

The tube 132 establishes an annularly-shaped space 134 around the cooling tube 124 that is preferably filled with oil 138 or other liquid having a specific heat greater than that of water. In this way liquid filling the annularly-shaped space 134 being in close thermal heat exchange contact with the cooling tube 124 increases thermal storage capacity of the coaxial ventilator 20.

As illustrated by dashed lines in FIGS. 15 and 16, the performance of the thermosyphon cooling tube coaxial ventilator 20 illustrated in those FIGS. can be further enhanced by extending the annularly-shaped space 134 along the length of the thermosyphon cooling tube 124 upward and outward beneath the pan 84. This extension of the tube 132 upward and outward permits the liquid having a specific heat greater than that of water to contact the bottom of the pan 84.

In this way the thermosyphon cooling tube coaxial ventilator 20 depicted in FIGS. 15 and 16 having the double layer pan 84 and cooling tube 124 filled on the inside with water 126 that is surrounded by and separated from the liquid that fills the tube 132 and that has a specific heat greater than that of water:
1. permits using a smaller diameter water-filled pan 84; and
2. further increases the cooling storage capacity of the coaxial ventilator 20.

Furthermore, the thermosyphon cooling tube coaxial ventilator 20 depicted in FIGS. 15 and 16 simplifies suspending the coaxial thermosyphon cooling tube coaxial ventilator 20 in comparison with supporting an alternative coaxial ventilator 20 having a larger roof top water-filled pan 84.

While the cooling tube preferably is a thermosyphon cooling tube 124, the inner return tube included in a thermosyphon cooling tube 124 may be omitted although this reduces cooling tube efficiency. If the return tube of the cooling tube 124 is omitted, then its outer tube must:

1. have a larger diameter than that of the cooling tube 124 if the cooling tube is to achieve the same amount of heat transfer; or
2. if of the same outer diameter as the cooling tube 124, have a shorter length than that of the thermosyphon cooling tube 124 and can provide only a lesser amount of heat transfer due to stagnation inefficiencies and inversion layer formation that results from the tube's smaller diameter.

Figure 17:
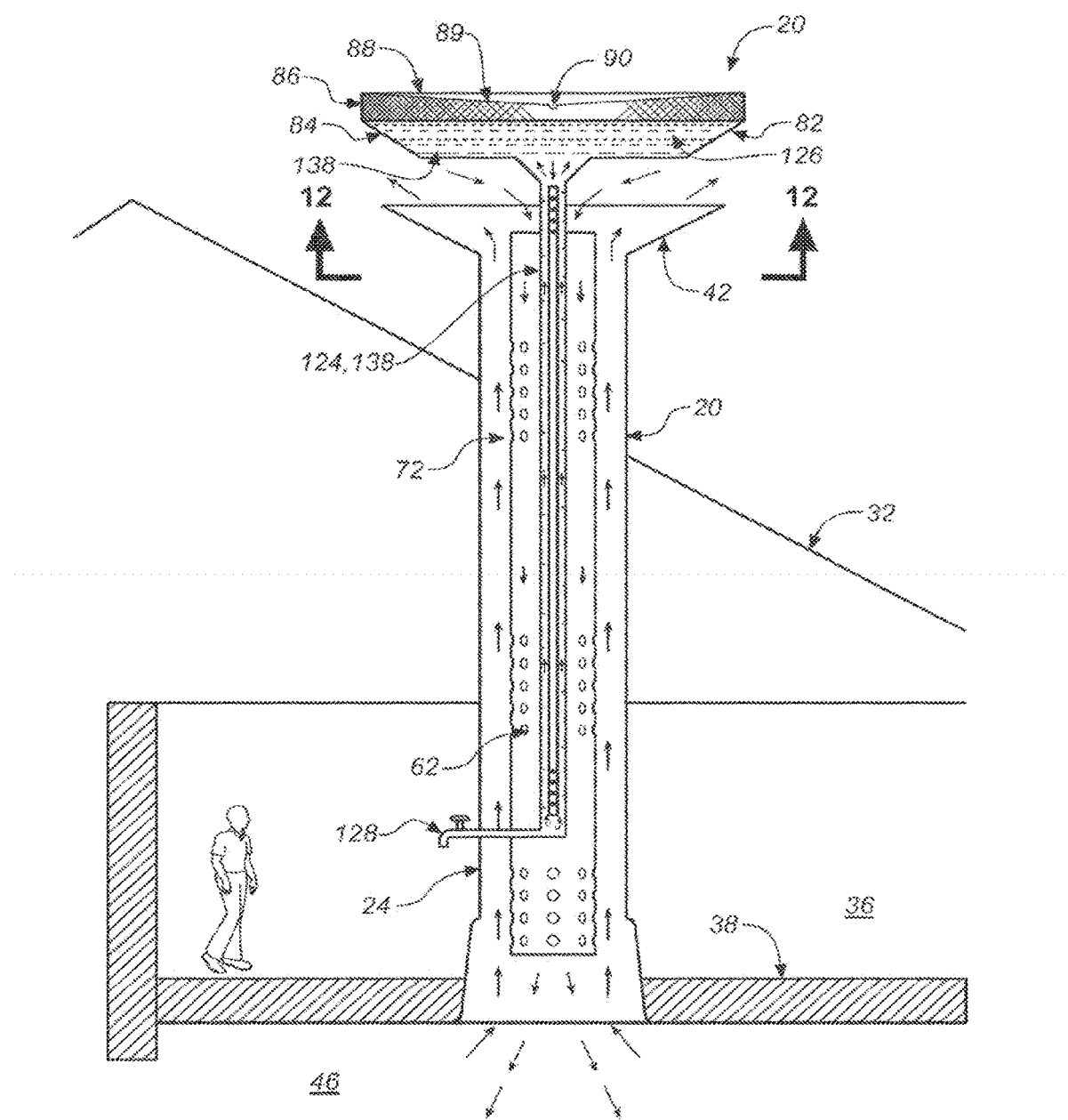
FIG. 17 illustrates an alternative configuration for the thermosyphon cooling tube coaxial ventilator depicted in FIG. 13 in which both the lower portion of the covered pan and the cooling tube are filled with oil rather than water with only the upper portion of the cover pan above the oil being filled with water.

In yet another alternative embodiment of the coaxial ventilator 20 depicted in FIG. 17 the lower portion of the covered pan 84 and the cooling tube 124 are filled with oil 138 rather than water. The cooling tube 124 and the pan 84 are first filled with oil 138 up to approximately half the depth of the pan 84. The pan 84 above the oil is then filled with:
1. rain water collected through the lid 88; or
2. water from a piped supply controlled by a float valve (not illustrated in any of the figures).

In the configuration depicted in FIG. 17, the drain tap 128 is not used for drawing collected rainwater. Rather, the drain tap 128 at the bottom of the cooling tube 124 is now opened only when the oil has to be drained off for servicing the cooling tube 124, or for changing of the oil, probably once every three or four years.

The oil chosen for use in the alternative embodiment depicted in FIG. 17:
1. must be immiscible in water;
2. must be heavier than water;
3. should not evaporate at room temperatures;
4. should remain liquid and free flowing at room and ambient temperatures; and
5. have a much higher specific heat capacity than water.

For such an oil, water in the pan 84 floating on the oil and cooled by evaporation sinks and contacts the oil to thereby cool the oil below.

Layering water for evaporation above oil, with oil extending down into the thermosyphon cooling tube 124 including the inner return tube, increases the cooling capacity of the cooling tube 124 by:
1. using oil to store the "coolness" while
2. still permitting the water to evaporate and cool the oil below.

And this is done without incurring additional structural cost of a double walled pan 84 and/or a double walled cooling tube as was shown in FIGS. 15 and 16, etc., or otherwise having to enlarge the cooling tube and coaxial ventilator 20. For the embodiments of the coaxial ventilator 20 depicted in FIGS. 15 through 17, material forming the cooling tube 124 and the surrounding tube 132 must be impervious so the liquid therein cannot evaporate or leak out.

The illustrations of FIGS. 18 and 19 depict yet another alternative embodiment coaxial ventilator 20 which includes multiple liquid-filled cooling tubes 124. Similar to the cooling tube 124 depicted in FIGS. 11 and 12, each of the cooling tubes 124 respectively descends downward from the covered pan 84. However rather than descending along the central axis surrounded by the inner conduit 62, the multiple cooling tubes 124 depicted in FIGS. 18 and 19 descend into an annularly-shaped space 72 located between the inner conduit 62 and an outer conduit 24 of the coaxial ventilator 20. In the embodiment of the coaxial ventilator 20 depicted in FIGS. 18 and 19, the cooling tubes 124 may have the same configuration as any of the various different types of cooling tubes that are described in greater detail above and depicted in FIGS. 11 through FIG. 17.

Figure 20:
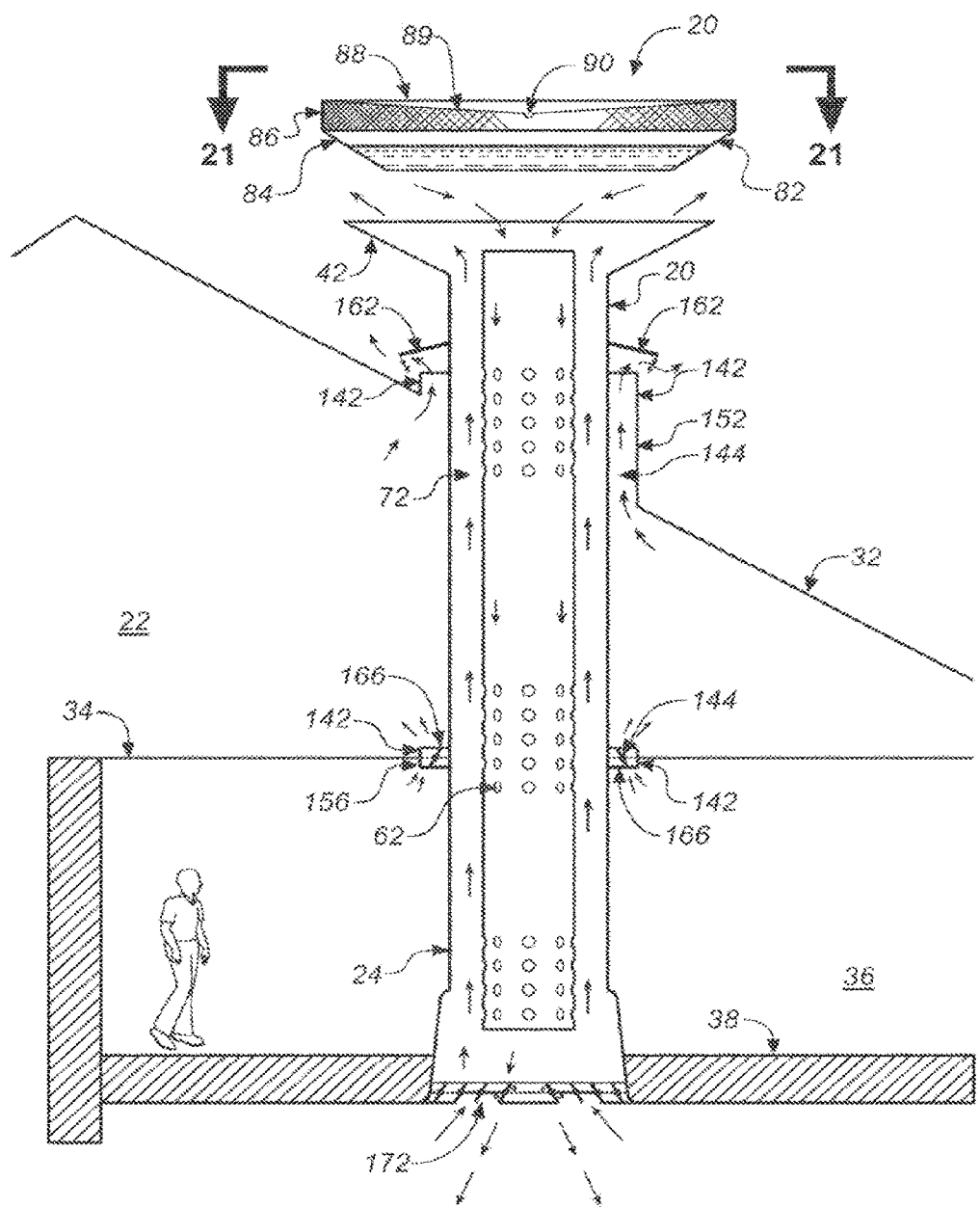
FIG. 20 adds to a copy of FIG. 2 a pair of optional, hollow collar flanges that encircle the coaxial ventilator respectively immediately above the building's roof and also at a ceiling within the building.

Referring now to FIGS. 20 and 21, the outer conduit 24 of the coaxial ventilator 20 depicted in those figures is encircled by a pair of optional, hollow collar flanges 142 respectively located:

1. above the roof 32 of the building 22; and
2. at a ceiling 34 within the building 22 through which the coaxial ventilator 20 passes.

Encircling the outer conduit 24 with the collar flanges 142 establishes an open, annularly-shaped space 144 between the outer conduit 24 and the roof 32 and ceiling 34 respectively about the coaxial ventilator 20. The annularly-shaped spaces 144 facilitate ventilating spaces within the building 22 both below and above each of the collar flanges 142.

At the roof 32, attached to a hole through the roof 32, the collar flange 142 includes a collar flashing 152 that extends upward a distance above the roof 32 sufficient to impede rainwater from splashing from the roof 32 into the annularly-shaped space 144. Because the upper end of the collar flashing 152 is smaller in diameter than the pan 84, the upper opening of the collar flashing 152 about the outer conduit 24 is inherently somewhat shielded from the entry of rainwater. Where the coaxial ventilator 20 penetrates the ceiling 34, the collar flange 142 includes an open annular collar 156 that passes through the ceiling 34 and extends a short distance above and below the ceiling 34.

The upper end of the collar flange 142 extending above the roof 32 preferably includes flap shutters 162 that may be closed both to block airflow through the collar flange 142 and the entry of rainwater thereinto. Correspondingly, the collar flange 142 extending through the ceiling 34 preferably includes dampeners 166 that may be rotated to a closed position to block airflow through the collar flange 142.

Both collar flanges 142 respectively located at the roof 32 and at the ceiling 34 when open provide additional ventilation that reduces any build up or stagnation of warm air about the coaxial ventilator 20 at the roof 32 and the ceiling 34. Including the collar flanges 142 about the coaxial ventilator 20 advantageously keeps the immediate vicinity of the coaxial ventilator 20 cooler thereby improving its efficiency in transferring cool air from the pan 84 to the room 36 below without the air becoming unduly heated.

As illustrated in FIG. 20, the coaxial ventilator 20 depicted in any of the various FIGS. may also include as set of dampeners 172 located at the lower end of the coaxial ventilator 20. In climates which experience both heat in summer and cold in winter, both the shutters 162 and the dampeners 166 as well as the dampeners 172 are left open during summer so hot air can escape from the building 22, and closed in winter to conserve heat within the building 22.

Figure 20A:
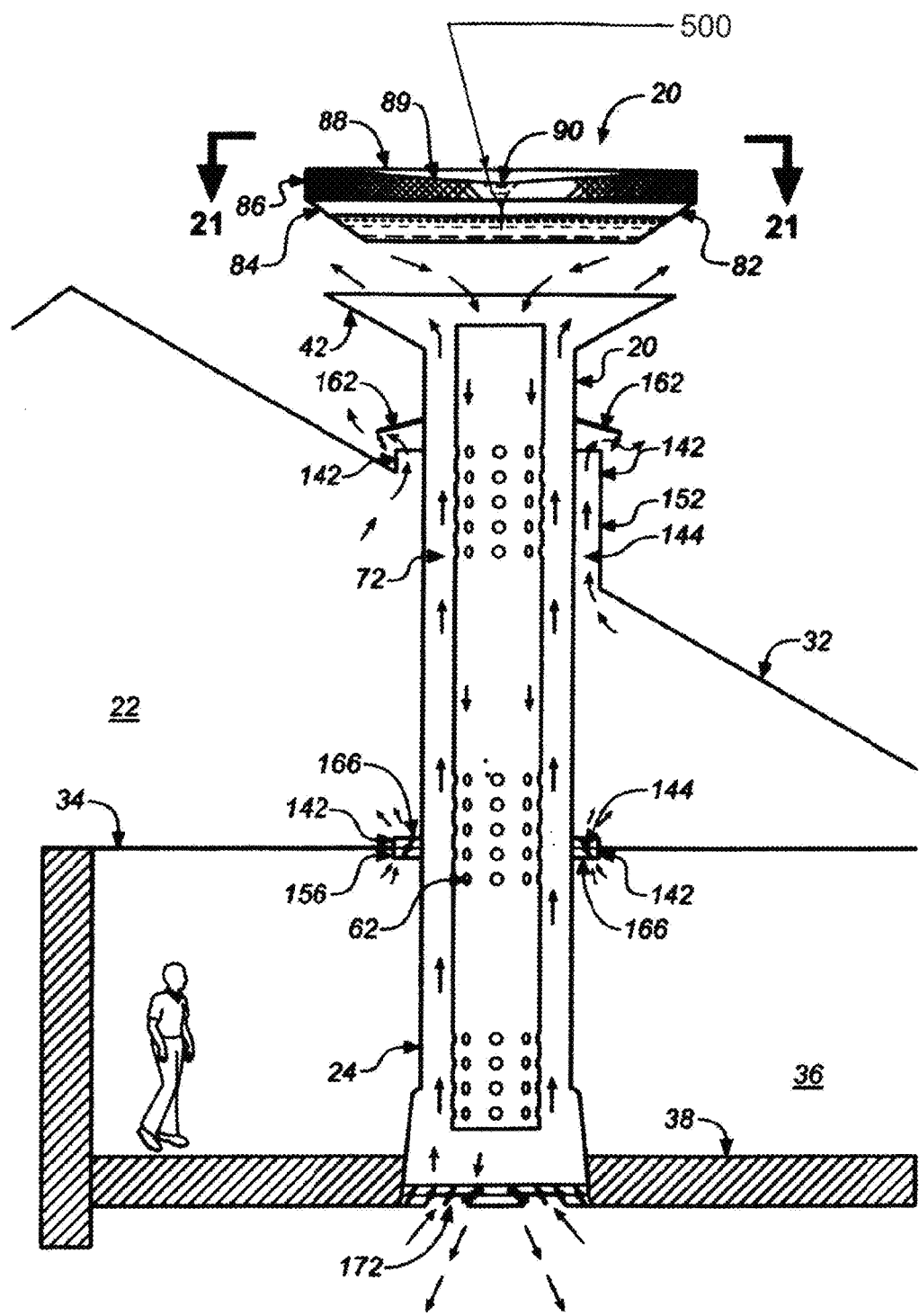
FIG. 20A shows another aspect of the coaxial ventilator of FIG. 20, further including a thermoelectric cooling module.

FIG. 20A shows another aspect of the coaxial ventilator of FIG. 20, further including a thermoelectric cooling module 500. FIG. 20A shows another method of filling the water pan 84 with water that can be used in locations where is it difficult to bring a piped water supply to fill the water pan 84. As shown in FIG. 20A, a thermoelectric Peltier cooling module or other cooling module 500 is located at the bottom of the lid 88 to condense atmospheric water vapor into water droplets which then drip into and fill water pan 84. Solar photovoltaic cells could be used to provide power the cooling module 500 and could be mounted on the top surface of lid 88, or positioned at another suitable location. The photovoltaic cells could also be used to charge batteries (not shown), thereby extending the power supply of the cooling module 500 into the night, when solar power is no longer available. Additionally, a lower end of the cooling module 500 could extend into and below the surface of the water in the pan 84 to provide additional cooling capacity by directly cooling the water pool itself.

Although the present invention has been described in terrors of the presently preferred embodiment, it is to be understood that such disclosure is purely illustrative and is not to be interpreted as limiting. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

The invention claimed is:

1. A coaxial ventilator for exchanging atmosphere between parts of a building at differing heights, the coaxial ventilator comprising:
    an outer conduit positioned at a location of a building and having an upper end and a lower end;
    an inner conduit surrounded by the outer conduit and extending substantially along the entire length of the outer conduit with an upper end and a lower end of the inner conduit being located near the upper end and lower end of the outer conduit;
    the outer conduit and the inner conduit being open to atmosphere surrounding the coaxial ventilator only at the respective upper ends and lower ends thereof, the upper end of the outer conduit being locatable above a roof of the building;
    a cover disposed above the upper end of the outer conduit that occludes the upper ends of both the inner and outer conduits, preventing precipitation from entering thereinto, permitting atmosphere to enter thereinto, the cover including a pan spaced a distance above the upper end of the outer conduit, the pan being adapted for holding liquid, a lid spaced a distance above the pan, and mesh that spans between peripheries of the pan and the lid; and
    a fan positioned above the water pan for increasing the evaporative heat loss rate from the water pan.

2. The coaxial ventilator of claim 1, further comprising at least one thermosyphon cooling tube adapted to be filled with a liquid, the cooling tube positioned beneath and in fluid communication with the pan and extending into at least one of the inner and outer conduits, the cooling tube increasing thermal conductivity between the pan, the liquid within the pan, and the inner and outer conduits.

3. The coaxial ventilator of claim 2, further comprising a jacket tube disposed around the cooling tube, the jacket tube and the cooling tube defining an annularly-shaped space therebetween, the annularly-shaped space adapted to be filled with a liquid, thereby increasing the thermal storage capacity of the coaxial ventilator.

4. The coaxial ventilator of claim 2, wherein the cooling tube is semi-permeable, thereby providing a surface area for evaporative cooling.

5. The coaxial ventilator of claim 2, further comprising at least one of a vertical axis exhaust wind turbine and an exhaust fan.

6. The coaxial ventilator of claim 5, further comprising an evaporative cooling mat suspended above and partially submerged in the water pan.

7. The coaxial ventilator of claim 6, wherein the evaporative cooling mat is wetted by way of spraying by pumps.

8. The coaxial ventilator of claim 2, further comprising photovoltaic cells for providing power to one or more of the vertical axis exhaust wind turbine, exhaust fan, and pumps.

9. The coaxial ventilator of claim 2, further comprising a cooling module positioned at the bottom of the lid and partially submergible in water held in the pan when the pan is full, the cooling module condensing atmospheric water vapor into water droplets, thereby filling the water pan, and directly cooling the water in the pan when the pan is full.

10. The coaxial ventilator of claim 9, wherein the cooling module is a thermoelectric cooling module.

11. A coaxial ventilator for exchanging atmosphere between parts of a building at differing heights, the coaxial ventilator comprising:
an outer conduit positioned at a location of a building and having an upper end and a lower end;
an inner conduit surrounded by the outer conduit and extending substantially along the entire length of the outer conduit with an upper end and a lower end of the inner conduit being located near the upper end and lower end of the outer conduit, the inner conduit having at least one hole formed therethrough for allowing an exchange of air between the inner and outer conduits in at least one location along the length of the outer conduit where a transition in temperature about the outer conduit occurs;
the outer conduit and the inner conduit being open to atmosphere surrounding the coaxial ventilator only at the respective upper ends and lower ends thereof, the upper end of the outer conduit being locatable above a roof) of the building;
a cover disposed above the upper end of the outer conduit that occludes the upper ends of both the inner and outer conduits, preventing precipitation from entering thereinto, permitting atmosphere to enter thereinto, the cover including a pan spaced a distance above the upper end of the outer conduit, the pan being adapted for holding liquid, a lid spaced a distance above the pan, and mesh that spans between peripheries of the pan and the lid; and a fan positioned above the water pan for increasing the evaporative heat loss rate from the water pan.

12. The coaxial ventilator of claim 11, further comprising at least one thermosyphon cooling tube adapted to be filled with a liquid, the cooling tube positioned beneath and in fluid communication with the pan and extending into at least one of the inner and outer conduits, the cooling tube increasing thermal conductivity between the pan, the liquid within the pan, and the inner and outer conduits.

13. The coaxial ventilator of claim 12, further comprising a jacket tube disposed around the cooling tube, the jacket tube and the cooling tube defining an annularly-shaped space therebetween, the annularly-shaped space adapted to be filled with a liquid, thereby increasing the thermal storage capacity of the coaxial ventilator.

14. The coaxial ventilator of claim 12, wherein the cooling tube is semi-permeable, thereby providing a surface area for evaporative cooling.

15. The coaxial ventilator of claim 12, further comprising at least one of a vertical axis exhaust wind turbine and an exhaust fan.

16. The coaxial ventilator of claim 15, further comprising an evaporative cooling mat suspended above and partially submerged in the water pan.

17. The coaxial ventilator of claim 16, wherein the evaporative cooling mat is wetted by way of spraying by pumps.

18. The coaxial ventilator of claim 12, further comprising photovoltaic cells for providing power to one or more of the vertical axis exhaust wind turbine, exhaust fan, and pumps.

19. The coaxial ventilator of claim 12, further comprising a cooling module positioned at the bottom of the lid and partially submergible in water held in the pan when the pan is full, the cooling module condensing atmospheric water vapor into water droplets, thereby filling the water pan, and directly cooling the water in the pan when the pan is full.

20. The coaxial ventilator of claim 19, wherein the cooling module is a thermoelectric cooling module.

* * * * *